ACOUSTIC-VIBRATION GENERATOR AND METHOD

INVENTORS
JOHN V. BOUYOUCOS
FREDERICK V. HUNT
BY Rines and Rines
ATTORNEYS

INVENTORS
JOHN V. BOUYOUCOS
FREDERICK V. HUNT
BY Rines and Rines
ATTORNEYS

INVENTORS
JOHN V. BOUYOUCOS
FREDERICK V. HUNT
BY Rines and Rines
ATTORNEYS

INVENTORS
JOHN V. BOUYOUCOS
FREDERICK V. HUNT
BY Rines and Rines
ATTORNEYS

May 21, 1957 J. V. BOUYOUCOS ET AL 2,792,804

ACOUSTIC-VIBRATION GENERATOR AND METHOD

Filed June 24, 1954 11 Sheets-Sheet 5

INVENTORS

JOHN V. BOUYOUCOS
FREDERICK V. HUNT

BY Rines and Rines

ATTORNEYS

ACOUSTIC-VIBRATION GENERATOR AND METHOD

INVENTORS
JOHN V. BOUYOUCOS
FREDERICK V. HUNT
BY Rines and Rines
ATTORNEYS

ACOUSTIC-VIBRATION GENERATOR AND METHOD

INVENTORS
JOHN V. BOUYOUCOS
FREDERICK V. HUNT
BY Rines and Rines
ATTORNEYS

ACOUSTIC-VIBRATION GENERATOR AND METHOD

Filed June 24, 1954 11 Sheets-Sheet 8

INVENTORS
JOHN V. BOUYOUCOS
FREDERICK V. HUNT
BY Rines and Rines
ATTORNEYS

ACOUSTIC-VIBRATION GENERATOR AND METHOD

INVENTORS
JOHN V. BOUYOUCOS
FREDERICK V. HUNT
BY Rines and Rines
ATTORNEYS

ACOUSTIC-VIBRATION GENERATOR AND METHOD

INVENTORS
JOHN V. BOUYOUCOS
FREDERICK V. HUNT
BY Rines and Rines
ATTORNEYS

INVENTORS
JOHN V. BOUYOUCOS
FREDERICK V. HUNT

BY Rines and Rines
ATTORNEYS

United States Patent Office 2,792,804

Patented May 21, 1957

2,792,804

ACOUSTIC-VIBRATION GENERATOR AND METHOD

John V. Bouyoucos, Cambridge, and Frederick V. Hunt, Belmont, Mass.

Application June 24, 1954, Serial No. 439,085

55 Claims. (Cl. 116—137)

The present invention relates to methods of and apparatus for generating elastic vibrations and, more particularly, to acoustic-vibration generators. The term "acoustic" will hereinafter be employed, both in the specification and claims, to connote not only sound vibrations of the audible spectrum, but, more generically, elastic vibrations of all types, including sub-audio and ultrasonic or supersonic vibrations.

Many different types of elastic-vibration generators have heretofore been proposed. Generators of the piezoelectric, magnetostrictive, and magnetomotive types, for example, have been widely used for many purposes including the generation of underwater vibrations for use in underwater detection and communication, or for the agitation of liquid or other media. One of the chief drawbacks of acoustic-vibration generators of this character, however, has been the relatively limited power that can, in practice, be so generated, particularly at the very low and at the very high ends of the sound spectrum. In order to produce vibrations of appreciable power, it has heretofore been proposed to produce vibratory motion of a piston or diaphragm in response to an oscillatory fluid pressure acting upon such a diaphragm or piston. Such proposals, however, have not been satisfactory for many reasons including the difficulty of generating adequate oscillatory fluid pressure, the inability to sustain planar vibrations of the diaphragm or the piston with high power over large areas, the inefficiency of such systems, and their constructional complexity.

Still other means have been proposed for the purpose of producing vibrations of appreciable power, such as by making the vibrating mechanical element an integral member of a type of hydraulic oscillator. In such systems, the elastic element acts as, or supports, a valve which controls the flow of a fluid under pressure, the valve being excited into vibratory oscillation by means of the pressure fluctuations generated in the fluid flow at the fluid flow control point. Acoustic vibrations of the type produced by the self-excited motion of elastic-wall constrictions such as occur, for example, in the human larynx, or of the type produced by water-hammer action in a valve having a loose washer in a domestic plumbing system, or of the type described, for example, by Franz Aigner on pages 157 to 159 of Unterwasser-Schalltechnik (Berlin W., M. Krayn, 1922), all operate upon this principle involving the periodic excitation of the valving mechanism by dynamic forces parasitically generated locally in the immediate vicinity of the control point. Such local parasitic control is utilized, also, in generators of the type in which fluid flow is periodically modulated while passing between the outer surface of a vibrating elastic sphere and concentrically mounted hemispherical caps to produce fluid pulsations that may resonate a fluid column from which acoustic energy may be extracted.

Among the serious limitations of some of such systems is the fact that the elastic element, member or diaphragm is required not only to control the oscillation that it is performing, but, also, by virtue of its oscillation, to convey acoustic power to a load. This dual role leads to an inherently inefficient and unstable device. This can perhaps be more readily made evident by considering the inefficiency and instability of an analogous electronic oscillator circuit in which the load of the electron-tube oscillator is connected in the grid or control circuit rather than in the plate or power circuit. As the elastic element, member or diaphragm is directly employed to deliver acoustic energy, moreover, the power capacity of the system is, in practice, severely limited by the maximum stress or flexure that such a mechanical member can withstand. Other disadvantageous features of such prior-art proposals will later be explained in connection with a discussion of the improved results attained through the use of the present invention.

An object of the present invention is to provide a new and improved method of and apparatus for the generation of acoustic vibrations that are not subject to the above-named disadvantages, and that, to the contrary, are adapted for operation over wide frequency ranges and over both small and large areas, accomplishing such results with high power and high efficiency.

An additional object is to provide such a method and apparatus in which a fluid-pressure-actuated valving mechanism is employed for effecting a modulatory action upon an otherwise uniform flow of a fluid medium, the pressure variations arising from the alternate accelerations and decelerations of the fluid medium accompanying such modulatory action being used to control and sustain the action of the valving mechanism and/or to supply energy to an acoustic load.

A further object is to provide such a method and apparatus in which the fluid-pressure-controlled valving mechanism operates in conjunction with a frequency-controlling acoustic delay, or feedback, path to produce the acoustic vibrations. This result is attained by introducing the fluid medium under pressure into a housing within which or at the exit from which the flow of the fluid may be subjected to a variational or modulatory throttling action by said valving mechanism, the resulting fluid-dynamic forces being conveyed by means of the acoustic delay, or feedback, path to act upon the valving mechanism in such phase and magnitude as to control and sustain its valving action, thereby to produce a pulsating flow of the fluid medium for generating acoustic vibrations. The valving action herein referred to thus acts solely to convert the fluid energy in the uniform flow into vibratory, or acoustic energy. It has been found that only a fractional part of this vibratory energy needs to be utilized to maintain the control action of the valve system, whereas the rest of the energy is available to be consumed by an acoustic load. In this way, the power capacity of such an acoustic vibration generator is primarily limited only by the energy flux contained within the input of the generator or region of uniform flow, rather than by the energy storage capabilities represented by extreme flexure of the mechanism valving system with its proneness to fatigue failure under repeated severe strains. The sustenance of oscillations, moreover, is effected, in accordance with the present invention, through acoustic feedback from a point displaced from and external to the fluid valving or control point, as contrasted with the prior-art systems described by Aigner or the oscillated spherical valve system, before-mentioned. The external feedback of the present invention enables a greater degree of control over the oscillations and the attainment of other advantages, later discussed, than can be obtained through the use of the internal or locally generated forces in the immediate vicinity of the control point.

A further object is to provide a new and improved acoustic vibration generator of the character described that is particularly adapted for transmitting strong elastic vibrations into liquid and other media.

Other and further objects will be explained hereinafter and will be more particularly pointed out in the appended claims.

The invention will now be described in connection with the accompanying drawings:

Fig. 1 of which is an elevation, partly in section, illustrating a preferred embodiment of the invention;

Figures 1, 1A, 1B:
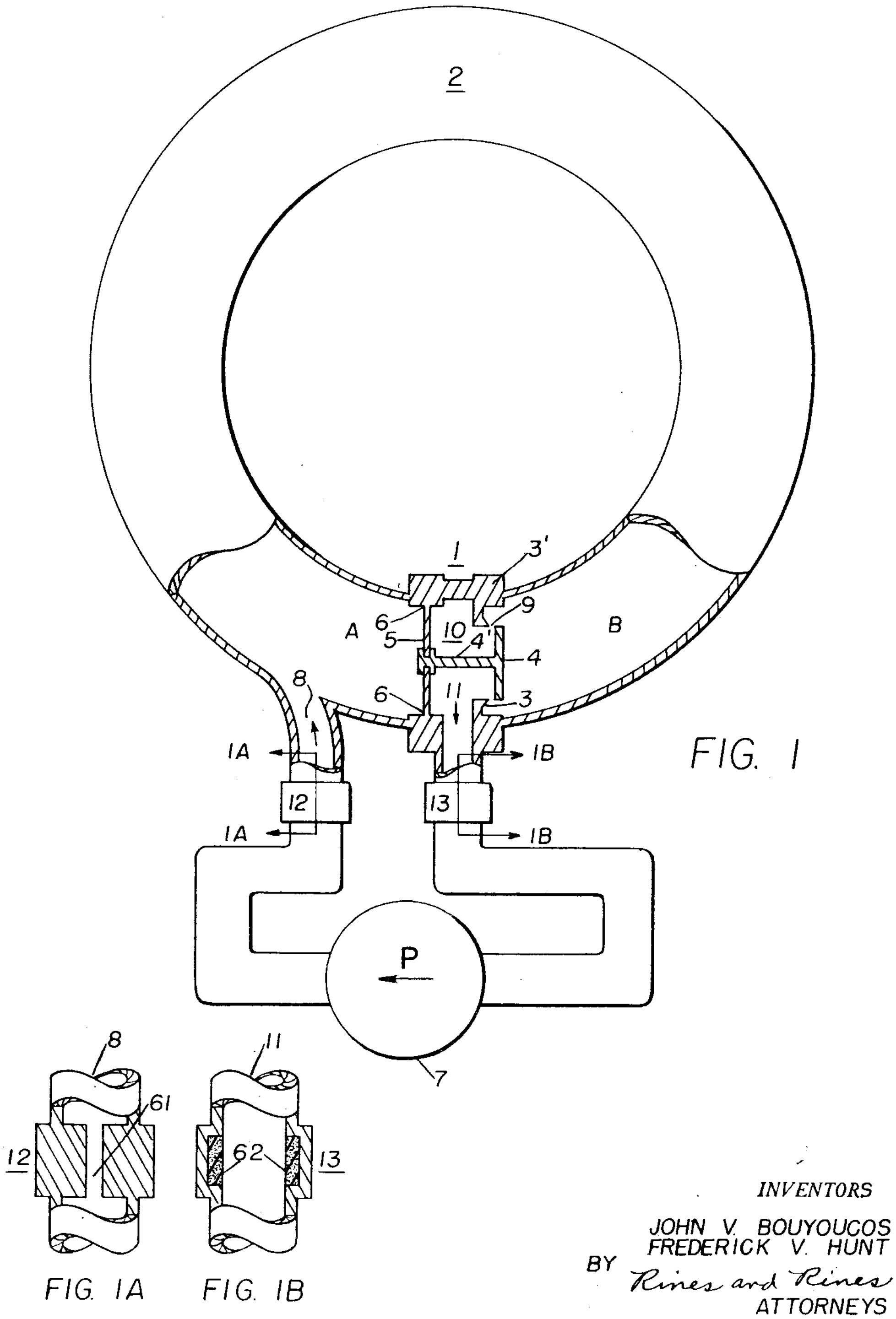
Figs. 1A and 1B are sections taken upon the respective lines 1A—1A and 1B—1B of Fig. 1, looking in the direction of the arrows.

Referring to Fig. 1, the acoustic generator is shown comprising a toroidal conduit or tubular housing 2, as of copper tubing, that forms a closed loop, illustrated as of circular contour, though oval, elliptical and other configurations may, if desired, be employed. At the bottom of the housing 2 there is disposed a pressure-actuated valve mechanism 1 that comprises a valve seat 3 and a planar valve 4. The valve seat 3 is rigidly secured to the walls of the housing 2 by a fitting 3', while the valve 4 is elastically supported by a strut 4' upon a circular elastic diaphragm 5 that is clamped at its edges 6 to the fitting 3'. Other types of rigid supports for the valve seat 3 and elastic supports for the valve 4 may be used, as later discussed. A pump 7 introduces fluid, such as water, under pressure into the loop 2 through an inlet 8, shown disposed on the left-hand side of the diaphragm 5. The fluid within the loop 2 exerts pressure against the left-hand side of the diaphragm 5 in the region A of the loop 2, tending to force the diaphragm 5 to the right, and thus to move the valve 4 to the right to expose an annular orifice 9 between the edges of the valve seat 3 and the valve 4. The fluid also circulates in a direction clockwise around the loop 2 and discharges through the orifice 9, provided between the edge of the valve seat 3 and the valve 4, into a chamber 10 between the diaphragm 5 and the valve 4. The chamber 10 enters into an outlet 11 which, in turn, returns the fluid to the pump 7, completing the fluid-flow circuit.

The inlet 8 is shown provided with a filter 12 which, for present purposes, is assumed to present a high acoustic impedance to pressure fluctuations in the loop 2, while the outlet 11 is provided with a filter 13 that acts as a pressure release and thus serves to eliminate dynamic pressure variations in the chamber 10 of the valve mechanism 1. The filters 12 and 13, however, should present negligible impedance to the steady flow of the fluid in the loop 2, though they serve to isolate the acoustic-generator structure 1—2 from the pump source 7 of the fluid medium. Examples of the form that the filters 12 and 13 may assume are illustrated respectively in Figs. 1A and 1B. The filter 12 of Fig. 1A is of the low-pass type comprising an internal constriction 61 within the inlet 8. Such a constriction 61 permits the passage of a steady direct-current fluid flow from the pump 7 into the loop 2 through the inlet 8, but it presents a high mass reactance to any acoustic pressure variations in such flow. This acoustic filter is thus analogous to a series inductance in an electrical circuit, and isolates the acoustic generator 1—2 from the pump 7. The filter 13, on the other hand, as shown in Fig. 1B, comprises a foam rubber or similar wall lining 62, preferably recessed within a larger-diameter section of the outlet 11. The filter 13 will yield freely to any pressure variations in the outlet 11 through the resilient action of the lining 62, thus acting in the manner of a capacitive shunt to ground in an electrical circuit.

When the loop 2 is filled with the fluid medium introduced under pressure through inlet 8 from pump 7, the diaphragm 5 will be acted upon by the pressure existing in the region A, and the corresponding force will act to control the position of the valve 4 with respect to the valve seat 3. Since the position of the valve 4 with respect to the valve seat 3 determines the area of the orifice 9, control is therefore also exercised upon the fluid velocity and upon the rate of removal of the fluid medium from the loop 2 through the chamber 10 and the outlet 11. When the valve 4 is closed into the valve seat 3, it is effective to prevent the removal of the fluid medium from the loop 2, while when the valve 4 is displaced from the valve seat 3 it becomes effective to permit the exit of the fluid medium. An explanation of the operation of the apparatus of Fig. 1 may be facilitated by assuming that the circuital volume velocity of the fluid medium in the loop 2 is entirely dependent upon the annular orifice area 9 between the valve 4 and the valve seat 3. It will further be assumed that there is negligible lag between the action of pressure fluctuations upon the elastic diaphragm 5 and the resulting changes in this orifice area 9 effected by the consequent movement of the valve 4 in response to movement of the diaphragm 5. As before explained, for example, a positive pressure increment in the left-hand region A of the loop 2, on the left-hand side of the diaphragm 5, will create a displacement of the valve 4 away from its seat 3, to the right. This, in turn, yields an incremental increase in the area of the orifice 9. The left-hand side of the diaphragm 5 may therefore be considered as a pressure-actuated control terminal, instantaneously determining the fluid flow from the loop 2 through the orifice 9 into the valve chamber 10 and the outlet 11. Let it be further assumed that the pump 7 creates a pressure differential $P_0$ across the orifice 9 that establishes a volume velocity from $Q_0$ throughout the hydraulic circuit 7—8—2—9—10—11—7. At some instant of time, suppose that the orifice 9 undergoes an incremental closure, to the left. Such closure will tend to decelerate the fluid flow in the immediate vicinity B of the loop 2 to the right of the valve mechanism 1. If this decrease in fluid velocity is represented by the quantity ΔQ, then the volume velocity Q in the region B will be given by the expression $Q=Q_0-\Delta Q$. Associated with this reduced velocity, and hence, also, with the accompanying reduced kinetic energy in the region B, there will be an increase in the potential energy in the region B and hence an increase in the pressure in the region B and, since the pressure in 10 remains unchanged, an increase in the pressure drop across the orifice 9. The new pressure P acting upon the closing orifice 9 may be represented by the expression $P=P_0+\Delta P$, where ΔP represents the before-mentioned pressure increase. Since such a transient pressure increase can not remain localized, it propagates or is transmitted as a pressure wave, with an acoustic velocity, C, counter-clockwise through the fluid medium in the loop 2, wiping out the volume-velocity increment ΔQ, before discussed, as it progresses back along the loop 2. At the later instant when this fed-back pressure wave will have reached the region A, the fluid in the loop 2 will have assumed an increased pressure $P=P_0+\Delta P$, but at a reduced volume velocity $Q_0-\Delta Q$. This increased pressure on the valve diaphragm 5 will now push it to the right, causing an incremental opening of the valve 4 to the right. Such an opening increases the area of the orifice 9 and permits acceleration of the fluid flow in the region B of the loop 2. The volume velocity in the region B will therefore be increased by an amount ΔQ′, the volume velocity being now represented by the expression $Q=Q_0-\Delta Q+\Delta Q'$. Associated with this localized increase in velocity and hence kinetic energy in the region B, however, will be a decrease in pressure ΔP′, such that the pressure in the region B now becomes $$P=P_0+\Delta P-\Delta P'$$

As before, a pressure wave is created, but this time by a decrease in pressure so that the wave is of the opposite sign to that previously described. This negative pressure wave is fed back, propagated or transmitted counter-clockwise back around the loop 2, creating an incremental increase in velocity as it progresses. At the instant that this negative pressure wave enters the region A, on the left-hand side of the valving mechanism 1, the fluid in the region A assumes an increased velocity $Q=Q_0-\Delta Q+\Delta Q'$, but at a reduced pressure $$P=P_0+\Delta P-\Delta P'$$

This reduction in pressure at the left-hand side of the diaphragm 5 causes the diaphragm 5 to move to the left, and therefore moves the valve 4 to the left again to produce an incremental closure of the orifice 9 all over again, thereupon resulting in a decreased volume velocity $Q=Q_0-\Delta Q+\Delta Q'-\Delta Q''$ and an increased pressure $P=P_0+\Delta P-\Delta P'+\Delta P''$ in the region B, where ΔQ″ represents the incremental decrease in volume velocity, and ΔP″, the incremental increase in pressure. There has thus been a return to the original assumed state of affairs after the production of a complete cycle of periodic pressure build-up and collapse within the loop 2, and the oscillation will continue providing the following amplification condition is satisfied: ΔQ″ is at least as great as ΔQ′, which, in turn, is at least as great as ΔQ. The time period of the resulting periodic disturbance, which is inversely proportional to the frequency thereof, will be dependent upon the length L of the loop 2 and the velocity of the fluid medium, being determinable by the expression 2 L/C. The magnitude or amplitude of the disturbance is, of course, limited by the reaching of a point of non-linearity in the incremental amplification process, before described, of the valve mechanism 1.

Under the foregoing circumstances, the system of Fig. 1 generates elastic vibrations or oscillations, operating as an acoustic vibration generator. This analysis, however, has been simplified in that, apart from the stated assumptions, pressure reflections on the two sides of the valve mechanism 1 have been neglected. In actual practice such reflections have been found to produce standing-wave phenomena of essentially sinusoidal pressure waves in the loop 2, as a consequence of which the peak value of the energy stored elastically or kinetically in the resonating fluid system may far exceed the amount of energy supplied during each cycle by the uniform fluid inflow. Another neglected factor is the dynamic forces that may exist in the region B to act upon the valve 4 in conjunction with the forces exerted on the diaphragm 5. In actual practice, it is the net difference in the forces acting upon the diaphragm 5 and the valve face 4 that determines the response of the system, and in this case the actual frequency of oscillation is then, for all practical purposes, determined by the condition that the net acoustic reactance seen at any cross-section of the loop looking in the two directions normal to that cross-section shall vanish. The valve 4, however, may be isolated or neutralized from such dynamic forces acting directly upon it, as will hereinafter be discussed in connection with the embodiment of Fig. 12. In connection with the system of Fig. 6, on the other hand, there will be discussed an additional application of these dynamic forces acting directly upon the valve 4, in this case to provide push-pull operation.

Figures 1C, 1D, 1E, 1F:
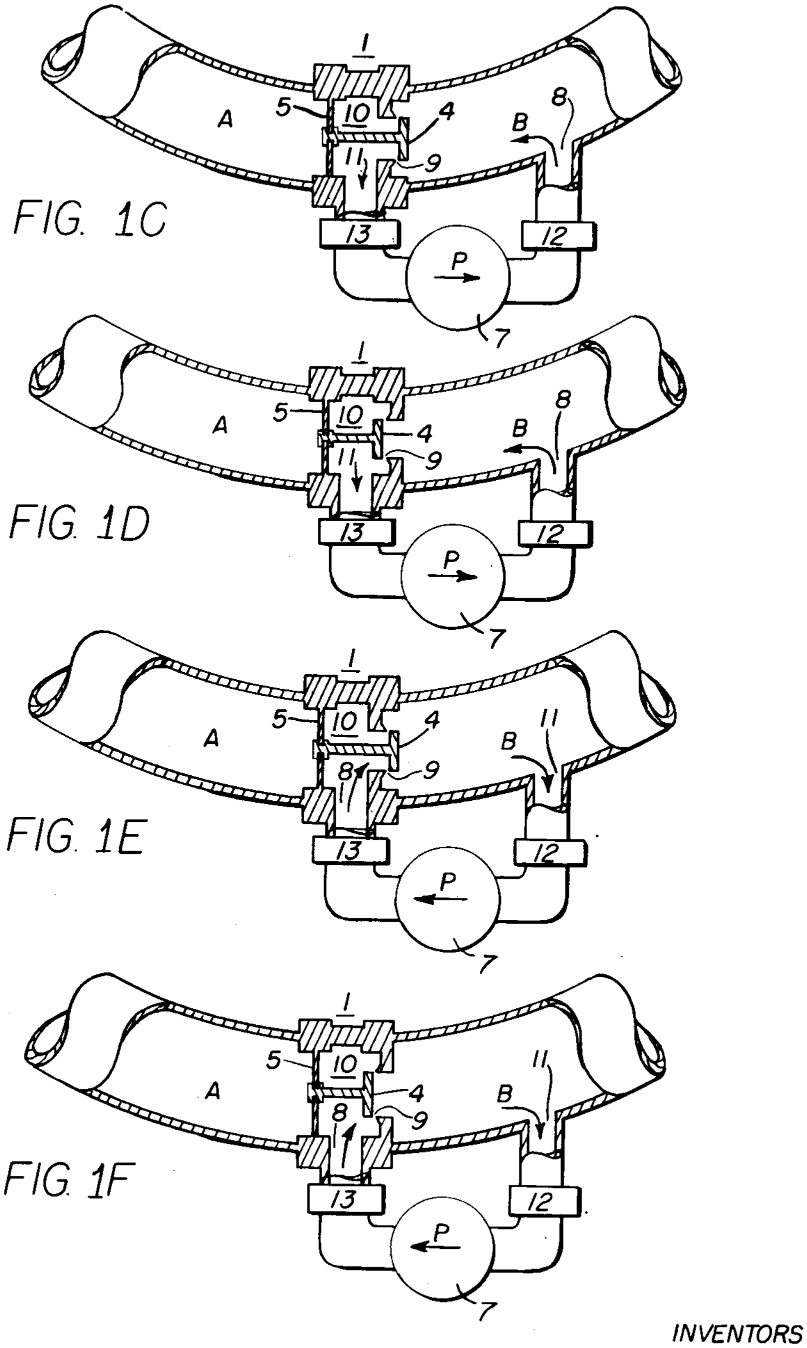
Figs. 1C, 1D, 1E and 1F are fragmentary views similar to Fig. 1 of modified valve mechanisms and fluid inlet and outlet conduits.

It should, furthermore, be noted that the direction of fluid flow through the valving orifice 9, and the geometric and dynamic states of the valving mechanism 1 of Fig. 1 are subject to a number of controlled variations any of which will yield an oscillatory system of the general form heretofore described. In Figs. 1C, 1D, 1E and 1F, four basic combinations of the valving system 1 and an associated direction of fluid flow are illustrated, each of which has the property that when the respective regions A and B are terminated in acoustic feedback systems, such as the loop 2 of Fig. 1, or such as may be produced by reflection from terminations of the type employed in the output of Figs. 4 and 17, the complete assembly may be expected to exhibit a self-oscillatory behavior. In Fig. 1C, which is identical with Fig. 1 except for the position of the inlet 8 from the pump, the valve 4 seats interior to region B, while the fluid discharges from region B through orifice 9 into chamber 10. The oscillator frequency must be so chosen that it is below the free-mechanical-resonance frequency of the diaphragm-valve system 5—4, so that the latter is stiffness-controlled and acts in phase with the net force differential. A net force directed to the left, for example, effects a closure of the orifice 9 and therefore a decelerated efflux of the fluid and an increase of the pressure in region B.

In Fig. 1D, the fluid flow direction is the same as in Figs. 1 and 1C, but the valve 4 seats external to region B. Under these circumstances the oscillator frequency must be so chosen that it is above the free-resonance frequency of the diaphragm-valve system 5—4, so that the latter is mass-controlled and acts in phase opposition to the net force differential. In this case, a net force directed to the left, at the said frequency of oscillation, is accompanied by a motion of the valve 4 to the right, thus effecting a closure of the orifice 9 and therefore a decelerated efflux of the fluid and hence an increase of the pressure in region B, as before.

In Figs. 1E and 1F, in contrast to Figs. 1C and 1D, the direction of the fluid flow has been reversed so that now the inlet 8 enters into chamber 10, the fluid passing through orifice 9 and into region B wherein the exit 11 is now placed. The steady flow circuit is thus 7—13—8—10—9—B—11—12—7. The valve 4 of Fig. 1E seats interior to region B, as in the embodiment of Fig. 1C. Since the fluid flow direction has been reversed from that of Fig. 1C, however, the oscillator frequency must be so chosen that it is above the free-resonance frequency of the diaphragm-valve system 5—4, so that the latter is mass-controlled and acts in phase opposition to the net force differential. A net force directed to the left at the said frequency of oscillation, therefore, is accompanied by a motion of the valve 4 to the right, thus effecting an opening of the orifice 9 and therefore an accelerated influx of the fluid and hence an increase of the pressure in region B.

In the apparatus of Fig. 1F, the valve 4 again seats exterior to region B as in Fig. 1D. Since the fluid flow direction has been reversed from that of Fig. 1D, however, the oscillator frequency must be so chosen that it is below the free-resonance frequency of the diaphragm-valve system 5—4 so that the latter is stiffness controlled and acts in phase with the net force differential. In this case, a net force directed to the left is accompanied by a motion of the valve to the left, thus effecting an opening of the orifice 9 and therefore an accelerated influx of the flow and hence an increase of the pressure in region B.

It should be observed that, in the foregoing descriptions of the various possible combinations of dynamic and geometric valve arrangements, and of the associated direction of fluid flow, that combination has always been chosen for which a net force on the valve system to the left, for example, at the frequency of oscillation, gives rise to a valve displacement effecting an increase of the pressure in region B, corresponding to either an accelerated influx or decelerated efflux of the fluid medium. In each case, this pressure change is in just the right direction to increase the aforementioned net force, and one may look upon this as a typical feature of the instability condition that gives rise to the desired oscillatory phenomenon when the timing of its action is appropriately controlled by transmitting the pressure change through the feedback loop 2.

In summary, therefore, and perhaps from a less technical point of view, the acoustic generator or oscillator of the present invention operates by virtue of an acoustic feedback principle applied to a fluid-pressure-actuated valving mechanism. Such a valving mechanism may be made to act periodically to modulate an otherwise uniform flow of a fluid medium and in so doing originate pressure variations, these arising from the alternate fluid accelerations and decelerations accompanying the modulatory process. These pressure variations may then be transmitted by an acoustic feedback path to the place where they can react in such phase and magnitude as to control and sustain the valving action, thereby producing a pulsating flow of the fluid medium for generating acoustic vibrations.

Figure 2:
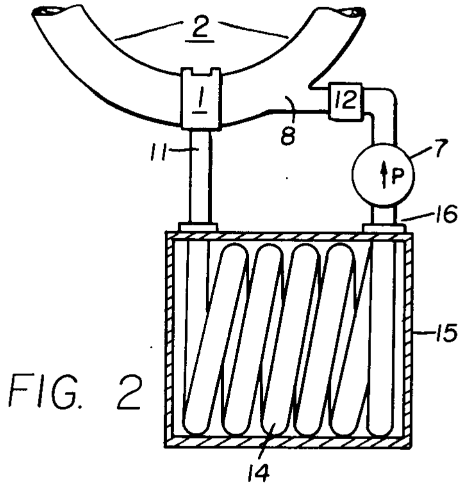
Figs. 2, 3, 4 and 5 are fragmentary views, similar to Fig. 1, illustrating various types of output coupling devices.

The acoustic pulsations or vibrations generated by the oscillator of Fig. 1, may be coupled out or conveyed to a load by any desired means. Several preferred output coupling devices are illustrated in Figs. 2, 3, 4 and 5. In Fig. 2, the valve mechanism 1 and the inlet 8 are understood to be disposed in the configuration illustrated by Fig. 1C, except that the outlet 11 is now to be connected directly to the left-hand end of a helically wound hose 14, that may be disposed within a tank 15. The right-hand end of the hose 14 is shown connected at 16 to the pump 7 to complete the hydraulic circuit. The hose 14 thus replaces the pulsation-absorbing filter 13 of Fig. 1 in the outlet 11. It is preferably constituted of rubber or a similar flexible material to permit, through flexible movement of its walls, the transfer of the acoustic pulsations into the tank 15. The tank 15, may, of course, be much larger than shown, in relation to the oscillator, and it may contain any desired fluid or other medium into which it is desired to transfer acoustic vibrations. The filter 12 between the inlet 8 and the pump 7 is still preferably employed to permit the passage of steady direct-current fluid flow from the pump 7, while at the same time presenting a high mass reactance to the acoustic pressure variations produced as the device oscillates.

Figure 3:
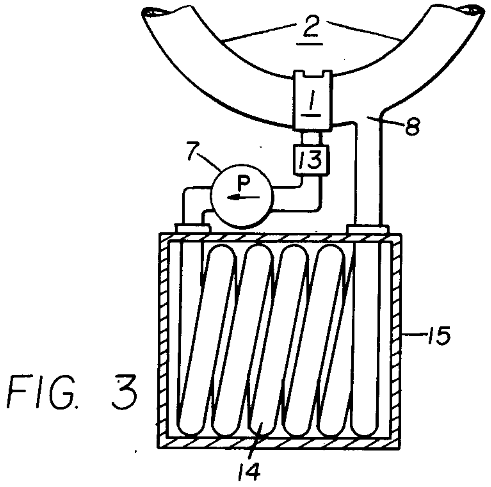

It may, however, be desired to substitute the load 14 for the filter 12 in the inlet 8 of the system 2. Such a substitution is illustrated in Fig. 3 wherein the right-hand terminal of the flexible-walled hose 14 is connected directly to the inlet 8 and the left-hand end is connected to the output side of the pump 7. Acoustic vibratory energy transmitted backward through the inlet 8 to the flexible wall hose 14 will thus be dissipated therein by transfer through the flexible walls of the hose 14 into the tank 15.

Figures 4, 5:
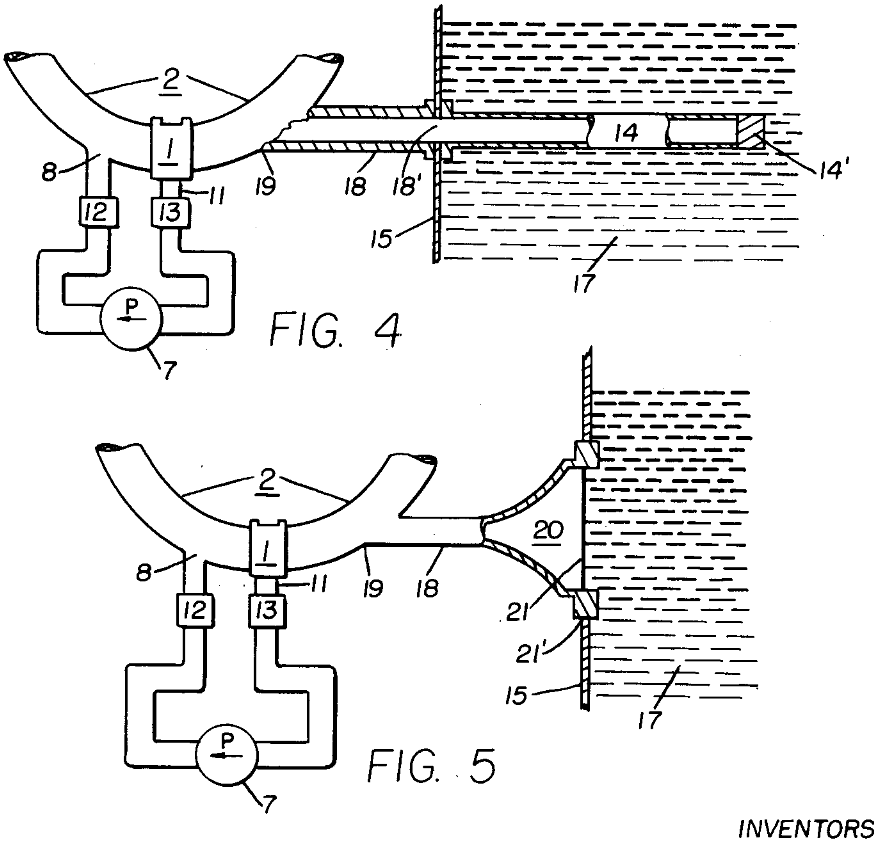

It is by no means necessary, though, that the load device 14 be disposed in the inlet 8 or in the outlet 11, as shown in Figs. 2 and 3. The load device may, in fact, be connected to any desired portion of the loop 2. The filters 12 and 13 may then both be utilized to isolate the acoustic circuit of the oscillator 1—2 from the hydraulic supply pump 7, as described in connection with the system of Fig. 1. In Fig. 4, as an illustration, the acoustic power generated by the oscillator is shown extracted by a conduit 18 tapped into the oscillator loop 2 at an intermediate point 19 thereof. The conduit 18 leads to the wall 15 bounding a fluid medium 17 and is coupled through an aperture 18′ in the wall 15 to a longitudinal section of flexible-walled hose 14 that extends longitudinally into the fluid medium 17. The hose 14 is shown terminated at 14′ so that it contains fluid from the loop 2. The oscillatory fluid pressure existing at the point 19 of the loop 2 will give rise to pressure waves that travel through the conduit 18 to the interior of the hose 14, the flexible walls of which will dilate and contract radially in those regions where the internal pressure is elevated or depressed by the oscillatory pressure waves transmitted therein. The dilations and contractions of the hose 14 give rise, of course, to corresponding radial motions of the external surfaces of 14, and these motions, in turn, will generate compressional acoustic waves in the medium 17 surrounding the hose 14. Acoustic energy is thus transferred from the oscillator 1—2 into the medium 17. In the case of a hose 14 that is very long compared to the wavelength of the generated acoustic energy, the acoustic-energy radiation pattern of the hose 14 may be quite directional and of the end-fire type, having a major lobe that substantially coincides with the longitudinal axis of the straight hose 14. In general, the width of the directivity pattern of such a hose 14 depends primarily upon the ratio of the velocity of the pressure wave within the hose 14 to the velocity of free acoustic waves in the medium 17, high directivity being achieved when this ratio approaches unity. The directivity pattern and the axial rate of acoustic energy transfer from the hose 14 to the medium 17 are thus dependent upon the characteristics of the media both within and without the hose 14 and also upon the properties of the material from which the hose 14 is fabricated. It is thus possible with the aid of a load 14 of this character to couple high power from the oscillator 1—2 and to transmit such high power with high directivity without resorting to diaphragms or pistons whose physical dimensions would need to be many times the acoustic wavelength in order to produce a corresponding directional gain. In addition, the oscillator 1—2 itself may have an outlet 18 that, unlike prior-art diaphragms and piston sources of acoustic energy, has dimensions that may be considerably less, instead of many times, the acoustic-energy wavelength.

Where it is desired purposely to employ a diaphragm to couple the acoustic energy into a medium, however, this may also be easily effected. The conduit 18 may, for example, be connected to a flared terminal portion 20 at the mouth of which a diaphragm 21 or other acoustic window is mounted. The mouth of the flared portion 20 and the diaphragm 21 mounted thereover may be secured within an aperture 21' in a wall 15 bounding a fluid or other medium 17 in which the diaphragm 21 is to transmit the acoustic energy from the oscillator 1—2.

In the systems of Figs. 1 through 5, as in the other embodiments of the invention hereinafter described, it is to be understood that while a particular load or use for the energy may be described in connection with any particular figure, this is illustrative only, and such load or use may equally well be adapted to the systems of the other figures. Typical uses for the acoustic energy include, for example, the agitation or processing of fluid and other media, and the production of acoustic signals for communication or object detection. If desired, moreover, a fluid to be processed may indeed be pumped from the pump 7 through the oscillator 1—2 itself, serving as the fluid for the oscillator.

We have successfully operated an oscillator of the character illustrated in Figs. 1 through 5 at, for example, oscillation frequencies ranging from 550 to 700 cycles per second with static fluid pressures from the pump 7 of from 20 to 50 pounds per square inch. The loop 2 was made of copper tubing having a wall thickness of about 0.1 cm., across-sectional diameter of about 1.5 cm. and a loop-length of about 75 cm. The ratio of the length of the loop 2 to the wave-length of the oscillations ranged from about 0.3 to about 0.4. The oscillation frequency, as later more fully explained, was below the mechanical resonant frequency of the valve assembly 1, which was about 1000 cycles per second. This valve assembly comprised a phosphor bronze diaphragm 5 about 0.06 cm. thick and having a free diaphragm diameter of about 1.9 cm. The material of the valve 4 itself was dural and the diameter of the valve seat 3 was about 1.6 cm. The fluid employed was water and the velocity of sound in the water-filled loop 2 as modified by the finite elasticity of the loop wall was about $1.3 \times 10^5$ cm. per second. The direct-current flow power input from the pump 7 was from 4 to 8 watts, and the circulating or reactive acoustic-oscillation power in the loop 2 of this particular relatively low-power oscillator was estimated to be several watts.

Figure 6:
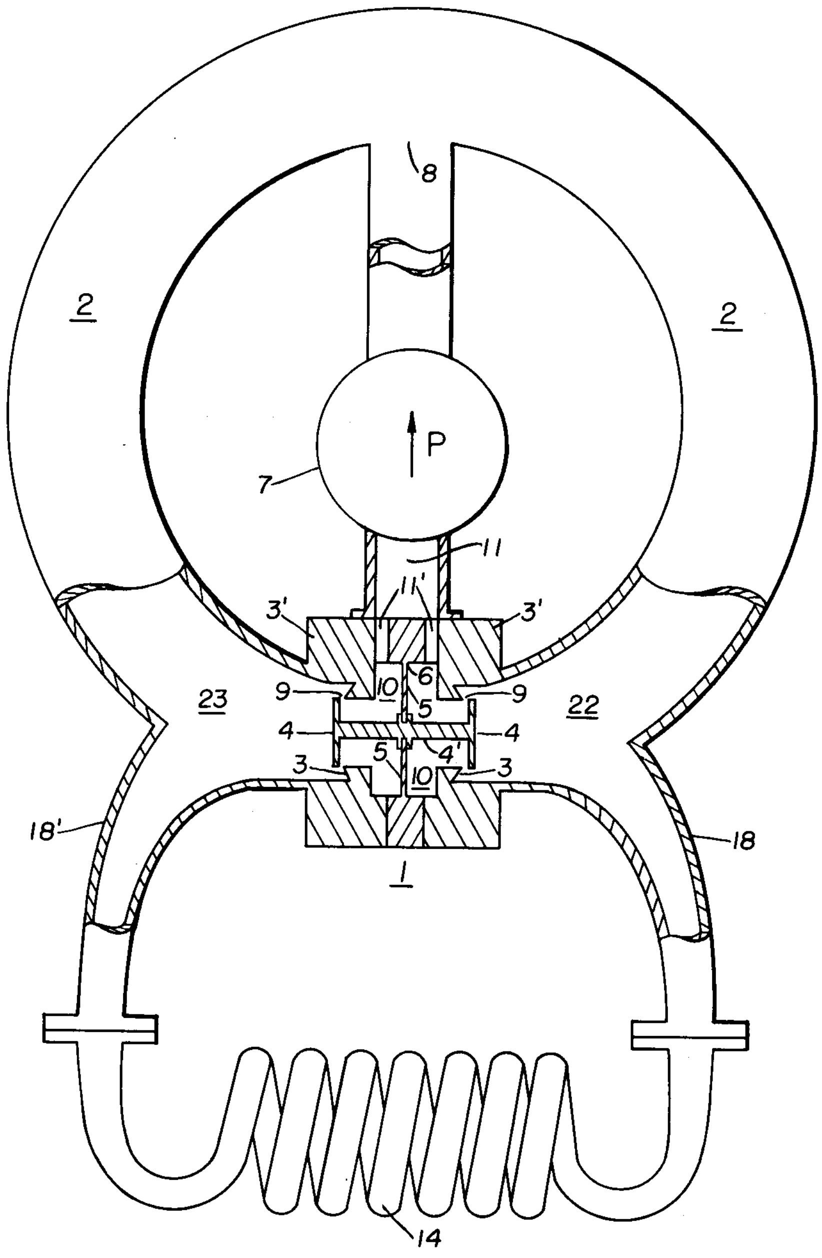
Fig. 6 is a view similar to Fig. 1 of a modification embodying a push-pull acoustic generator.

While the oscillator of Figs. 1 through 5 embodies a single feed-back loop between the left- and right-hand sides of the valve mechanism 1, it is possible to apply the techniques of the present invention to a push-pull type of hydraulic oscillator. Referring to Fig. 6, an oscillator is shown that, though similar to that illustrated in Fig. 1, is adapted for operation in push-pull. The valve mechanism 1 consists of two back-to-back valves 4 supported upon opposite sides of a common diaphragm 5. A displacement of the diaphragm 5 to the left, will open the left-hand valve 4 away from the left-hand valve seat 3 to expose the left-hand orifice 9, while at the same time moving the right-hand valve 4 toward the right-hand valve seat 3 to close the right-hand orifice 9. The pump 7 for establishing the hydraulic fluid supply to the oscillator feeds fluid to the inlet 8 which is now positioned at the uppermost portion of the loop 2, midway between the left-hand and right-hand sides of the valve mechanism 1. The right- and left-hand sections of the valve mechanism 1 are each provided with separate similar valve chambers 10 isolated from one another by the common diaphragm 5 and communicating through separate apertures 11' with the outlet 11. The outlet 11, in turn, connects with the pump 7 to complete the hydraulic circuit. The fluid from the pump 7 entering the inlet 8 thus divides between and flows in opposite directions in the symmetrical right- and the left-hand portions of the loop 2, discharging through the right-hand and left-hand orifices 9 of the valve mechanism 1 and through the right-hand and left-hand chambers 10 and apertures 11' into the outlet 11. For purposes of illustration, the oscillator 1—2 of Fig. 6 is shown provided with energy-extracting conduits 18 and 18', on opposite sides 22 and 23 of the valve mechanism 1, that connect to a flexible-walled hose load 14, which may be of the type discussed in connection with Figs. 2 and 3.

The operation of the oscillator 1—2 of Fig. 6 may be understood if it is considered that a steady flow of fluid from the pump 7 is established through the oscillator structure with the diaphragm 5 in its equilibrium or vertical position. In such a quiescent state, the pressure drops across the left-hand and right-hand orifices 9 of the valve mechanism 1 are equal and there is no net force tending to displace the diaphragm 5 of the valve mechanism 1. If the valve mechanism 1 should be given an incremental displacement, say to the left, there results a deceleration of the fluid flow through the right-hand orifice 9 accompanied by an increase in local pressure in the right-hand region 22 of the loop 2; while at the left-hand orifice 9, there is an acceleration of the fluid flow accompanied by a reduction in pressure in the left-hand region 23 of the loop 2. There is now produced a net pressure unbalance between the faces of the left-hand and right-hand valves 4 of the valve mechanism 1, tending further to increase the displacement of the diaphragm 5 to the left. The positive and negative pressure increments in the respective regions 22 and 23 of the loop 2, however, can not remain localized, and the resulting pressure waves are respectively fed back or propagated clockwise and counterclockwise around the loop 2 with the before-mentioned acoustic velocity. Upon reaching the face of the opposite valve 4 from which they originated, the propagated pressure waves tend to restore the pressure balance across the valve mechanism 1, allowing the diaphragm 5 to start to return towards its equilibrium position. The resulting movement to the right of the diaphragm 5, however, now produces fluid acceleration through the right-hand orifice 9 and deceleration at the left-hand orifice 9, re-creating a pressure unbalance of an opposite nature and tending to drive the diaphragm 5 past its equilibrium position and further to the right. Positive and negative pressure increments are now respectively created at the regions 23 and 22 of the loop 2, and the resulting pressure waves are respectively fed back around the loop 2 in opposite directions, tending to restore pressure balance at the valve mechanism 1 and thereby to move the diaphragm 5 back towards its equilibrium position again. A cyclical phenomenon is thus achieved, limited in amplitude only by the non-linearity in the system, provided only that, on each cycle after the initial infinitesimal pressure disturbance has been produced, the peak incremental fluid discharge increases, as above described.

The same simplifying assumptions discussed in connection with the operation of Fig. 1, apply, also, to the circuit of Fig. 6. In general, a complex standing-wave system is established within the loop 2 at a frequency such that the pressure waves in the regions 22 and 23 thereof are in phase opposition, thus aiding the oscillating movement of the diaphgram 5 of the valve mechanism 1. The resultant pulsating modulation of the flows of fluid through the two branches of the loop 2 serve to maintain the excitation of the system. The flexible-hose output coupler 14, since it is attached to the conduits 18 and 18', at the regions 22 and 23 of the loop 2 where the pressure waves are always in phase opposition, is therefore driven in push-pull to transmit acoustic energy through its flexible walls into the surrounding medium. It should be understood, of course, that any of the various geometric and dynamic valving arrangements and the associated directions of fluid flow, as discussed in connection with Figs. 1 through 1F, are, also, directly applicable to such a push-pull embodiment.

Typical constructional details and operating characteristics of a practical, though relatively low-power, push-pull oscillator of the character illustrated in Fig. 6, operating with the channels 18, 18' eliminated, follow. The loops 2 may be of brass tubing about 105 cm. in length, 1.55 cm. in cross-sectional diameter and 0.071 cm. in wall thickness. A water pump 7, as before described, can be used, and the velocity of sound within the loop 2 as modified by the finite elasticity of the loop wall is about $1.2\times10^5$ cm./second. The diaphragm 5 may again be of Phosphor bronze having a free diaphragm diameter of about 2.54 cm. Dural valves 4 operating with valve seats 9 of about 1.7 cm. diameter may be employed. Such an oscillator has been operated with acoustic oscillation frequencies of, for example, from about 250 to about 500 cycles per second—frequencies below the resonance frequency of the valve assembly 1, which was about 3500 cycles per second. The ratio of the loop length 2 to the acoustic wavelength was about 0.22 to 0.44. As in the previous case, with about 10 watts fluid power input, the reactive power circulating within the loop 2 was estimated to be several watts.

As another practical illustration, higher frequencies of the order of about 1050 cycles per second and substantially greater circulating power of the order of magnitude of 300 watts have been obtained with a somewhat shorter loop 2 of larger diameter. In this case, the total loop length was 98 cm.; the cross-sectional diameter, 4.45 cm.; the wall thickness of the loop, 0.16 cm.; and the modified velocity of sound within the loop, $1.15\times10^5$ cm./second. The valve seating was in this case constructed external to the loop 2, after the manner of Fig. 1D with appropriate modifications to conform to the push-pull configuration, rather than within the same as shown in Fig. 6. The valve assembly comprised a steel cantilever beam 4—5 having an orifice area 9 of 0.076 square centimeters on each side of the valve assembly 1 and an active valve surface area 4 of about 4 square centimeters on each side of the valve assembly. In this case, the mechanical resonant frequency was lower than the frequency of the generated acoustic waves, namely, about 800 cycles per second. The acoustic pressures developed at the valve faces 4 were about $10^6$ dynes $cm.^{-2}$. The direct-current flow input power was about 70 watts and the average input volume flow was about 260 $cm.^3$/second.

Figure 7:
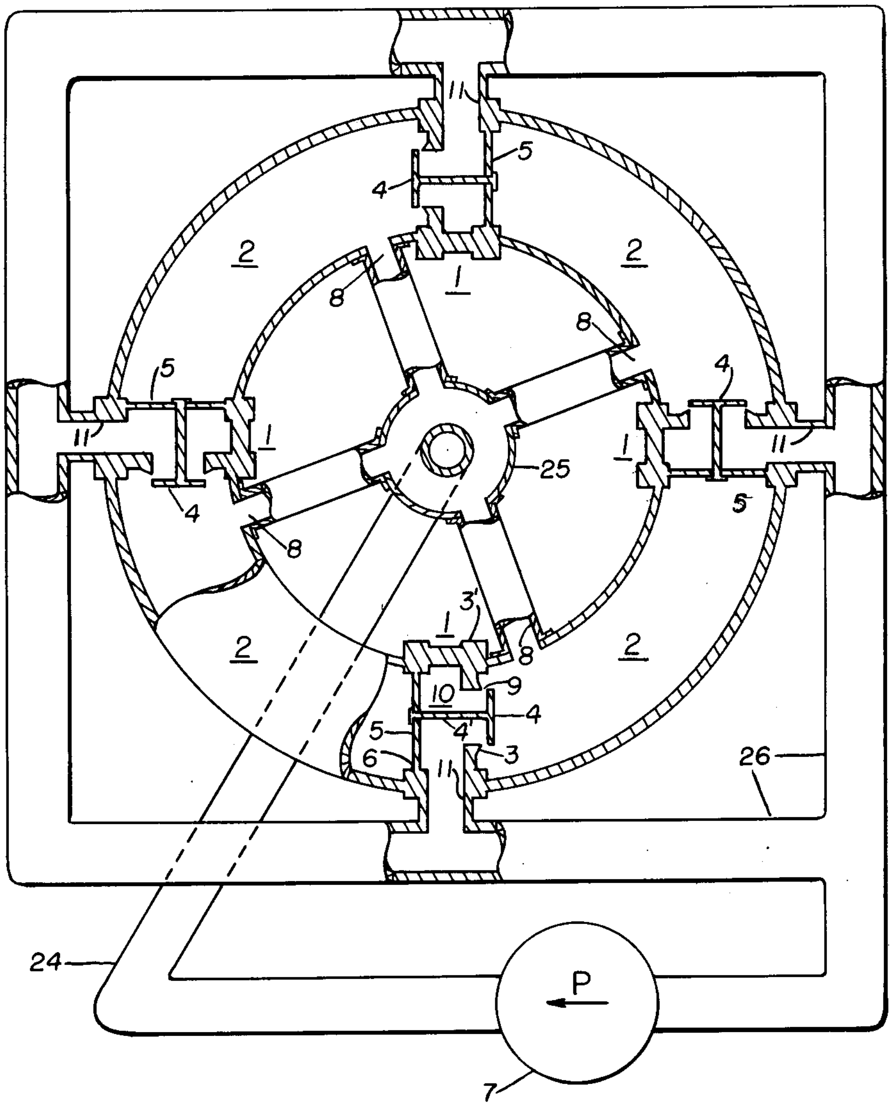
Fig. 7 is a similar view illustrating a further modification embodying a plurality of valve mechanisms of the type illustrated in Fig. 1.

The use of multiple-valve arrangements, as shown in Fig. 6, however, is not confined to push-pull operation alone. Multiple-valve mechanisms may also be utilized with a single-ended oscillator of the type shown in Fig. 1, as, for example, in the system of Fig. 7. In Fig. 7, a valve-amplifying mechanism 1 is employed in each of four quadrants of the loop 2. The pump 7 introduces the fluid by means of an inlet 24 feeding into the center of a well 25 that, in turn, communicates with four similar inlets 8. Each inlet 8 feeds fluid into one of four quadrants of the loop 2 so that all quadrants of the loop 2 are fed from the pump 7 simultaneously. The chambers 10 within each valve mechanism 1 in each quadrant of the loop 2 communicate through similar outlets 11 into a common conduit 26 that returns to the pump 7. The four valve mechanisms 1 are therefore series-connected through the quadrants of the conduit loop 2. A mode of oscillation of this system may be chosen so that the frequency of the acoustic waves is determined by the length of any one of the quadrants. In this manner, the lengths of these quadrant sections can be made shorter than is practical with the single continuous loop 2 of the basic oscillator of Fig. 1. For this reason, higher frequencies may, in practice, be obtained with the system of Fig. 7. Though the use of quadrant sections is usually desirable, sections of unequal lengths may also, in some cases, be employed. The operation of the system of Fig. 7, however, is precisely the same as that described in connection with the embodiment of Fig. 1, the design being such that all valve mechanisms 1 operate at substantially the same phase, each valve mechanism 1 thus, in effect, "seeing" its own image in the operation of the adjacent valve mechanisms 1.

Figures 8, 9, 10, 11, 11A:
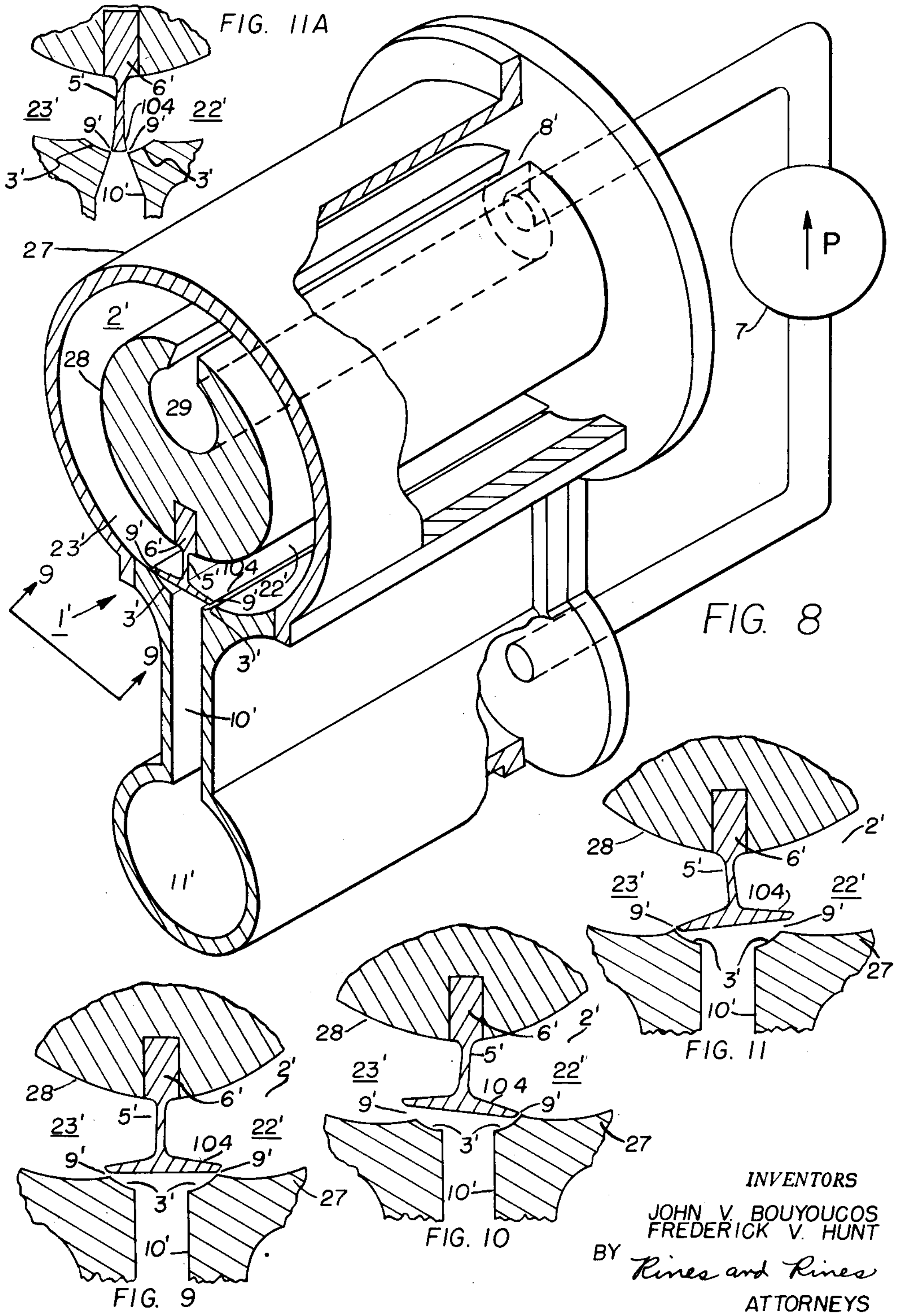
Fig. 8 is a perspective view of an additional modification that is particularly adapted for the production of high-frequency acoustic waves and that operates upon the push-pull principle, the figure being partly broken away to illustrate details of construction.
Figs. 9, 10 and 11 are sectional views, taken upon the line 9—9 of Fig. 8, looking in the direction of the arrows and illustrating three different positions of operation of the valving mechanism of the system of Fig. 8.
Fig. 11A is a view similar to Figs. 9 to 11 of a further modified valving mechanism.

The push-pull type of oscillator may also be used to obtain high frequencies, and, indeed, is deemed somewhat more practical for high-frequency operation. In the arrangement of Fig. 8, the feed-back path in the oscillator loop 2' consists of the annular region between a pair of concentric cylinders 27 and 28. The loop 2' is thus cylindrical, though annular in transverse cross section. The hydraulic flow originates with the pump 7 and enters into a cylindrical chamber 29 disposed near the upper portion of the cylinder 28. The chamber 29 communicates through a longitudinal inlet 8' with the loop 2' to feed the fluid into the loop 2'. A longitudinal valve mechanism 1' comprising a longitudinally extending vertically oriented elastic cantilever beam 5', corresponding to the elastic diaphragm 5 of Fig. 6, is mounted at 6' along the bottom of the cylinder 28. The beam 5' supports a horizontally disposed longitudinal valve 104 which serves to control the flow of the fluid in the loop 2' through left- and right-hand longitudinal slit orifices 9' at the tapered left- and right-hand longitudinal sides of a valve seat 3' disposed along the bottom of the cylinder 27. From the cylindrical feed-back loop 2', the fluid discharges through the longitudinal slit orifices 9', along a directrix of the cylinder 27, into a chamber 10' of the valve mechanism 1' depending from the valve seat 3', and the fluid is then returned to the pump 7 through the outlet 11'. It will thus be evident that the system of Fig. 8 employs elements that correspond to those employed in the system of Fig. 6, execpt that the elements are of longitudinally extending cylindrical configuration.

The operation of the push-pull oscillator of Fig. 8 is similar to that previously described in connection with the push-pull system of Fig. 6. Figs. 9, 10, and 11, illustrate three positions of operation of the particular valve mechanism 1' of Fig. 8. Fig. 9 illustrates the equilibrium position of the elastic beam 5' of the valve mechanism 1', where the pressure in the left-hand region 23' of the loop 2' and the pressure in the right-hand region 22' of the loop 2' are balanced. The areas of the left-hand and right-hand orifices 9' are then equal. Fig. 10 illustrates the position of the valve mechanism 1 when there is a pressure unbalance between the regions 22' and 23' of the loop 2', the net force tending to bend the elastic beam 5' to the left, thus closing the right-hand orifice 9' and opening the left-hand orifice 9'. The reverse condition of pressure unbalance is shown in Fig. 11. The use of this particular type of valve 104 and valve seat 3' insures that the valve 104 never comes into actual contact with the valve seat 3', the motion between the valve 104 and valve seat 3' involving, rather, a wiping action. In this manner, each orifice 9' may be effectively blocked over a considerable portion of the period of left-and-right oscillation of the elastic beam 5', and the fluid discharge through each orifice 9' occurs as a single short pulse delivered during each period of the said oscillation. The conversion of hydraulic energy from the pump 7 into acoustic energy in the loop 2' is thus rendered more efficient in a manner somewhat analogous to class B or class C biased operation of an electron-tube system. Through the use of the annular cylinders 27 and 28 defining the feed-back loop 2' and the longitudinal slit orifices 9' in the valve mechanism 1', moreover, a minimum channel length is provided, as required for high-frequency operation, and yet sufficient orifice area and channel volume is available to permit the large fluid flow-modulation and energy storage necessary for high power operation.

In Fig. 11A, an alternative valve configuration for the push-pull oscillator of Fig. 8 is shown wherein the active end of the cantilever beam 5' itself acts as the valve 104. In this case a motion of the beam 5' to the right closes the right orifice 9' and opens the left orifice 9', whereas in Fig. 11 a motion of the beam 5' to the right effects an opening of the right orifice 9' and a closing of the left orifice 9'. Thus the configuration of the valve in Fig. 11A is equivalent to external seating of the valve as described in connection with the single-ended valve assemblies of Figs. 1D and 1F, while the valve configuration of Figs. 8 to 11 is equivalent to internal seating, corresponding to Figs. 1C and 1E. By permitting, additionally, reversed flow direction from that shown in the oscillator of Fig. 8, the previously described different valving arrangements may be utilized to obtain oscillations.

Figures 12, 13:
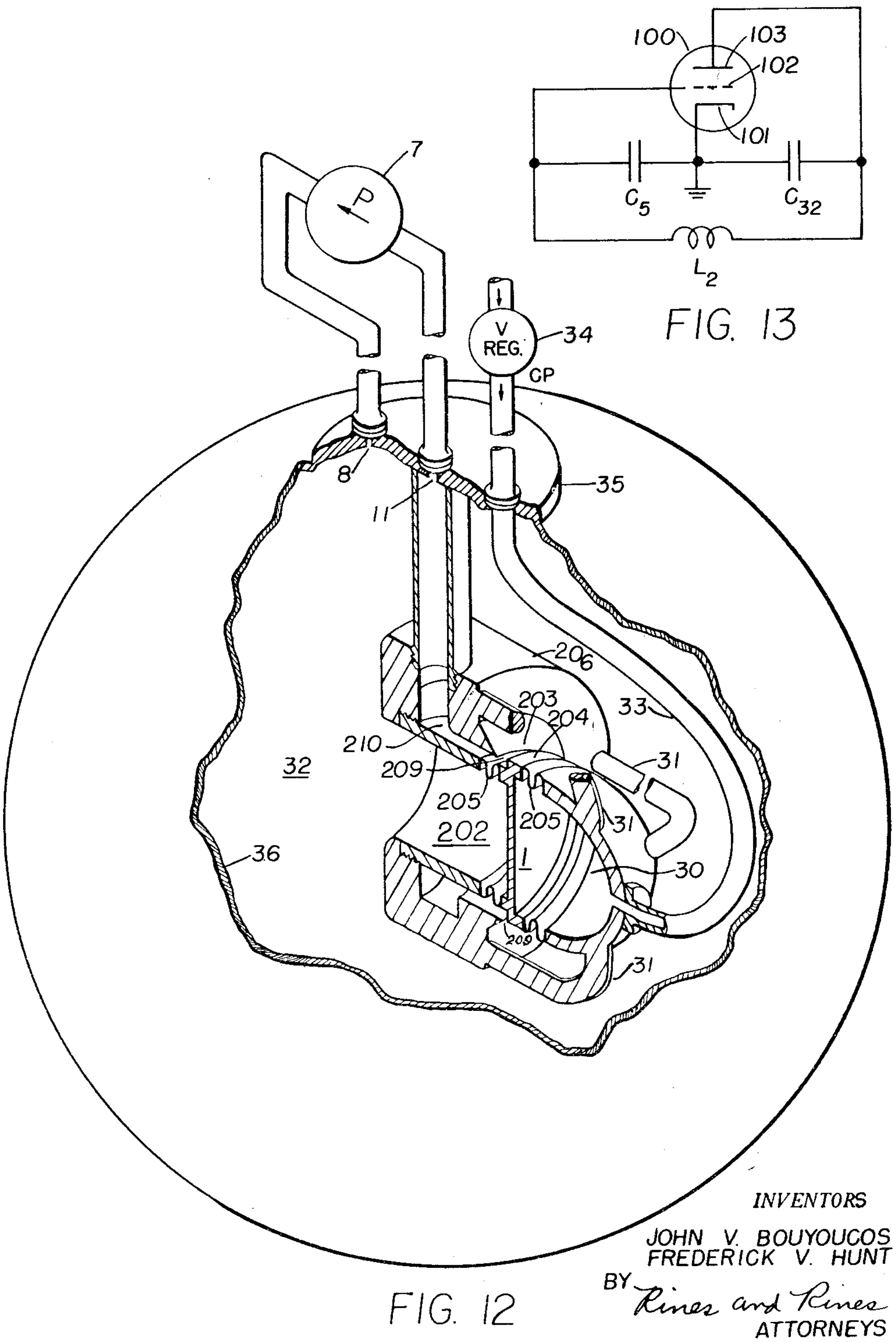
Fig. 12 is a perspective partly broken away and sectionalized, illustrating still another modification partly adapted for low-frequency operation.
Fig. 13 is an electrical circuit diagram of an electrical oscillator that is analogous to the acoustic generator of Fig. 12.

The hydraulic oscillators of the present invention may be designed in a wide variety of forms in addition to those previously discussed, analogous to the various well-known types of electric oscillators. Fig. 12, for example, illustrates an acoustic generator constructed in accordance with the present invention in a form analogous to the Colpitts type of electronic oscillator, shown in Fig. 13, and particularly adapted for low-frequency operation. The Colpitts oscillator is, of course, characterized by the connection of capacitance $C_5$ between the control electrode 102 and the cathode 101 of an electron amplifier 100, the connection of capacitance $C_{32}$ between the cathode 101 and the plate or anode 103 of the amplifier 100, and the shunting of the capacitances $C_5$ and $C_{32}$ by an inductance $L_2$ connected between the control electrode 102 and the plate or anode 103. For purposes of simplification, the plate-voltage supply is omitted from the oscillator of Fig. 13. The analogy between this circuit and the acoustic oscillator of Fig. 12 will be evident after a description of the structure of Fig. 12. This acoustic oscillator is in some respects quite similar to that illustrated in Fig. 1. Fluid is continually introduced under pressure from the pump 7 through the inlet 8 into the cavity 32 of a hollow elastic spherical-shell container 36, as of sheet metal. The inlet 8 passes through a cover plate 35 at the top of the sphere 36. The valve mechanism 1 consists of a rigid circular valve disc 204 circumferentially supported on either side by two elastic sylphon bellows 205. The right-hand face of the valve disc 204 is connected by means of the right-hand bellows 205 to an air chamber 30. The air chamber 30 is rigidly mounted by means of a plurality of strut supports 31 to the right-hand end of a hollow cylindrical block 206, the hollow 202 of which is disposed axially in-line with the circular valve disc 204 and is provided with a conical valve seat 203. The air chamber 30 serves dynamically to isolate or neutralize the right-hand face of the valve disc 204 from the fluid pressure variations produced in the spherical cavity 32. By controlling the air pressure in the chamber 30 through introducing air into an inlet 33 from a pressure valve 34 external to the sphere 36, the average pressure of the fluid in the cavity 32 upon the left-hand face of the valve disc 204 may be balanced. In addition, the relative pressures on the right-hand and left-hand faces of the valve disc 204 may be varied by adjustment of the pressure valve 34, thereby to control the initial or equilibrium area of the orifice 209 between the valve seat 203 and the valve 204. The fluid passing through the annular orifice 209 passes into a chamber 210 and then passes through the outlet 11 back to the pump 7. The valve mechanism 1 and the cylindrical block 206 are suspended in the cavity 32 from the plate 35 by the outlet 11.

The operation of this hydraulic generator may be explained as follows: Assuming that a steady flow has been established in the hydraulic circuit above described, and that the valve mechanism 1 is caused to perform an incremental closure, as discussed in connection with the other embodiments of the invention, the fluid flow through the orifice 209 is then throttled with the result that a pressure rise is established throughout the fluid contained in the cavity 32. This pressure rise produces both a compression of the fluid contained within the cavity 32, and an expansion of the shell wall 36 of the sphere, and is accompanied by a displacement of fluid into the hollow 202 of the block 206. An increase in the pressure upon the left-hand face of the valve disc 204 is thereby produced, causing the valve disc 204 to move to the right and away from the valve seat 203, thus increasing the area of the orifice 209. This, in turn, allows more fluid to discharge through the chamber 210 and the outlet 11, reducing the pressure across the orifice 209. Accompanying the reduced pressure associated with this increased discharge rate will be an expansion of the fluid within the cavity 32, a contraction of the shell wall 36, and a release of fluid from the hollow 202 of the block 206. The pressure on the left-hand face of the valve disc 204 is thereby reduced, allowing the orifice 209 to close again. The resulting decrease in orifice discharge produces a rise in the pressure in the fluid of the cavity 32 again, and so on. It is thus evident that, as in the case of the system of Fig. 1, pressure fluctuations are fed back through the transmission path provided by the members 202 and 32, in just such a way as to sustain self-excitation of the oscillator. This acoustic oscillation, moreover, will occur at a frequency at which the effective acoustic compliance of the shell wall 36 lumped in parallel with the compliance of the fluid contained therein resonates with the series impedance of the mass of the fluid contained within the hollow 202 and the acoustical compliance of the suspension of the valve mechanism 1. For the specific oscillator of Fig. 12, this frequency must be low enough for the equivalent wavelength of pressure waves in the fluid enclosed within the shell 36 to be at least as large or larger than the diameter of the shell 36.

The radial motion of the external surfaces of the shell 36 as it compresses and expands, as previously explained, may be used to impart acoustic energy stored in the oscillator to the medium surrounding the shell 36; or, if desired, other output coupling means may be used, as before discussed. The analogy to the electronic Colpitts oscillator of Fig. 13 will now be evident, inasmuch as the coil $L_2$ of Fig. 13 corresponds to the acoustic mass of the feed-back hollow 202, the condensor $C_{32}$ corresponds to the acoustic compliance of the spherical cavity 32, condenser $C_5$ corresponds to the compliance of the suspension of the valve 204, and the valve 204 itself is analogous to the amplifier tube 100.

In a practical example conforming functionally to the embodiment of Fig. 12, the feed-back cavity 202 was given the form of a reentrant loop about 80 cm. in length, and the cavity 32 was cylindrical in form and had a volume of about 2960 cubic centimeters. The acoustic compliance of the latter cavity (corresponding to $C_{32}$ of Fig. 13) was about $0.6\times10^{-6}$ cm.$^4$ sec.$^2$ gm.$^{-1}$; the acoustic compliance of the valve assembly 1 (corresponding to $C_5$ in Fig. 13) was about $0.3\times10^{-6}$ cm.$^4$ sec.$^2$ gm.$^{-1}$; and the acoustic inertance of the fluid in the feed-back loop (corresponding to $L_2$ of Fig. 13) was about 5.15 gm. cm.$^{-4}$. The frequency of oscillation can be predicted on theoretical grounds to be just the resonance frequency of the analogous circuit, $C_5C_{32}L_2$ of Fig. 13, which is given by the formula $$f=\frac{1}{2\pi}\sqrt{\frac{C_5+C_{32}}{L_2C_5C_{32}}}$$

where $\pi$ is the ratio of the circumference to the diameter of a circle. Using the numerical values given above, the predicted frequency is about 157 cycles per second, which is in good agreement with the experimentally observed oscillation frequency of about 150 cycles per second. When an average input power of 50 to 60 watts was supplied by an average input volume flow of about 320 cm.$^3$ sec.$^{-1}$ at an average supply pressure of about 25 pounds per square inch (or $1.7\times10^6$ dynes cm.$^{-2}$), the peak value of the energy stored in the elastic compliances correspond to a circulating or reactive power of about 170 watts. Under these conditions of operation, the R. M. S. acoustic pressure acting across the valve assembly 1 was about $2\times10^6$ dynes cm.$^{-2}$ and the R. M. S. variational acoustic pressure amplitude observed within the cavity 32 was about $10^6$ dynes cm.$^{-2}$.

Figure 17:
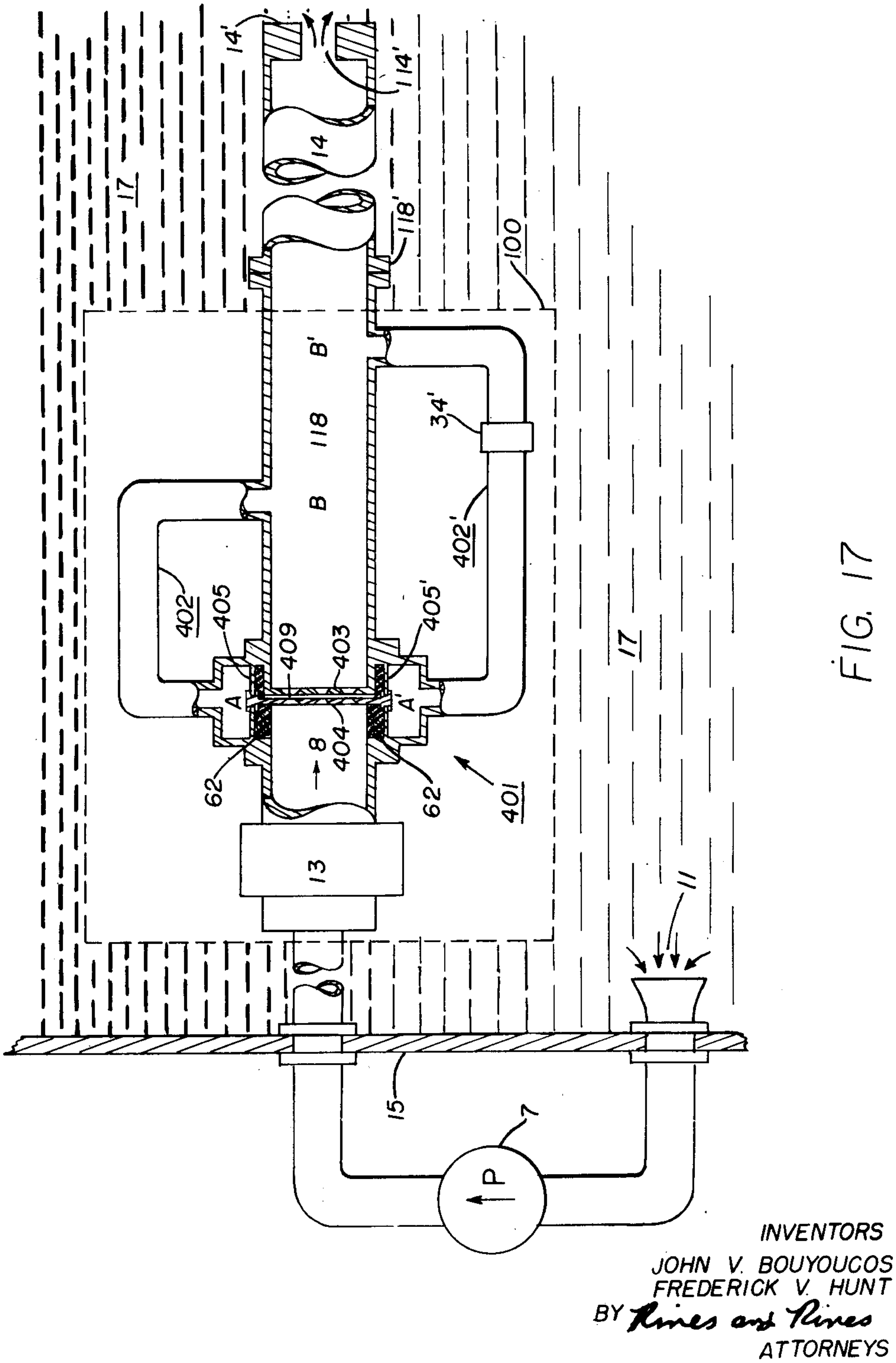
Fig. 17 is a side elevation, partly in section, of a further modified acoustic oscillator.
Figures 18, 19:
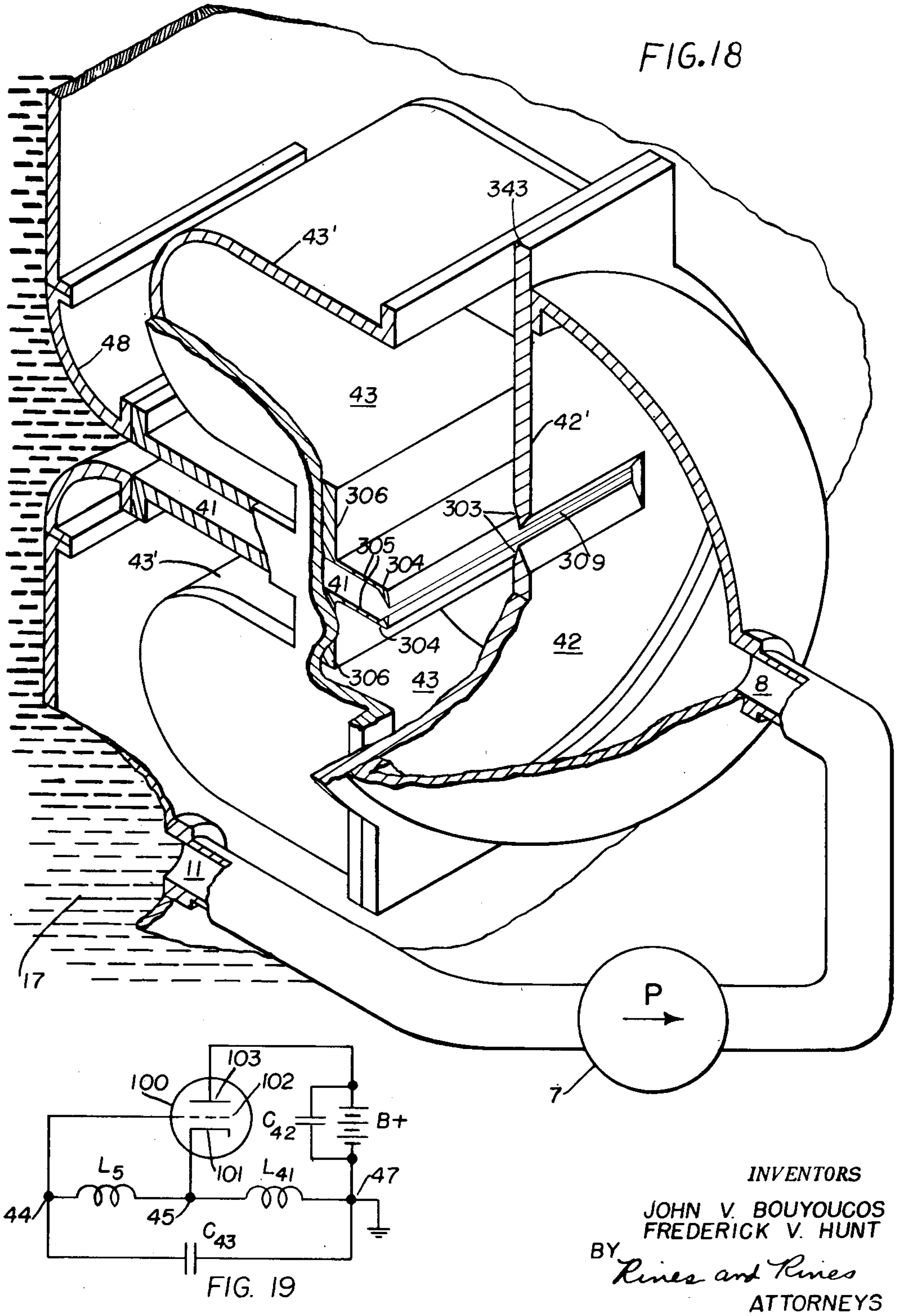
Fig. 18 is a view similar to Fig. 12 of still another modification.
Fig. 19 is an electrical circuit diagram illustrating an electrical oscillator that is analogous to the acoustic generator of Fig. 18.

An example of still another type of hydraulic oscillator is illustrated in Fig. 18. This oscillator is analogous to the so-called Hartley type of electronic oscillator shown in Fig. 19, which is characterized by the connection of inductances $L_5$ and $L_{41}$ between the control electrode 102 and a terminal 45 of the cathode 101 of the amplifier 100, and between the terminal 45 and the anode 103, respectively. The plate supply voltage source B+ is here shown shunted by a capacitor $C_{42}$ and inserted in series with the inductance $L_{41}$ in the connection from the preferably grounded right-hand end 47 of the inductance $L_{41}$ to the plate 103. Shunted across the inductances $L_5$ and $L_{41}$ of the Hartley-type oscillator is a condenser $C_{43}$, shown connected between the left-hand terminal 44 of the inductance $L_5$ and the right-hand terminal 47 of the inductance $L_{41}$. In the analogous acoustical generator constructed in accordance with the present invention, the pump 7 introduces fluid through the inlet 8 into a substantially hemi-spherical chamber 42 the median-plane boundary wall 42' of which is provided with a knife-edge rectangular valve seat 303 oriented along a median diameter of the chamber 42. A pair of preferably horizontally disposed parallel elastic cantilever beams 305, defining therebetween a channel 41, support, along their free edges, valve projections 304 disposed parallel to the edges of the valve seats 303. Upward and downward bending of the elastic beams 305 causes the valves 304 to perform a wiping action across the valve seats 303, thereby regulating the effective flow area of the orifice 309 between the valves 304. The particular type of valve-wiping action is more fully explained hereinafter in connection with the system of Figs. 14 to 17. The upper and lower beams 305 are mounted at 306 to the lower and upper walls, respectively, of upper and lower U-shaped fluid-containing chambers 43, secured to the wall 42' by flanges 343. The fluid in the chambers 43 thus directly contacts the surfaces of the beams 305. Fluid passing through the orifice 309 enters into the discharge channel 41 and passes out, through flared horn-type walls 48, into an external fluid medium 17, returning to the pump 7 through the opening 11. Other energy output coupling devices may, of course, be employed.

The acoustic circuit of the oscillator thus consists of the acoustic compliance of the chambers 43, corresponding to the electrical capacitance $C_{43}$ of Fig. 19 and the acoustic mass of the beams 305 in series with the mass of the fluid within the channel 41, corresponding to the electrical inductances $L_5$ and $L_{41}$, respectively, of Fig. 19. In Fig. 18, moreover, the reservoir-action of the hemispherical cavity 42, absorbs pressure variations on the right-hand face of the valve seats 303, and corresponds to the electrical capacitor $C_{42}$ of Fig. 19. The B+ voltage source of Fig. 19, of course, finds its analogue in the pump 7 of Fig. 18. The amplifier action of the electronic amplifier 100 of Fig. 19 corresponds to the opening and throttling effect of the variable area of the orifice 309 formed between the valve seats 303 and the valves 304. Small changes in the pressure differential across the valve beams 305, therefore, through the resulting motion of the valves 304, as more particularly explained later in connection with the similar valves of Fig. 14, create a large change in the fluid flow through the orifice 309 in a manner similar to the way in which small changes in voltage across the inductance $L_5$ of the electronic circuit of Fig. 19 can create a large change in plate current flowing through the amplifier tube 100. The frequency of operation, of course, is much higher than the free resonant frequency of the elastic cantilever beams 305. This again is more fully explained in connection with Fig. 14. Thus, at the operating frequency the motion of the beams 305 is in opposition to the applied force generated between the upper and lower chambers 43 and the channel 41, and a positive pressure increment in the fluid in the chambers 43 with respect to the fluid in the channel 41 will cause an opening in the orifice 309 and an increase in the discharge of the fluid. This is analogous to a positive voltage increment at the point 44 of the electronic circuit of Fig. 19, with respect to the cathode point 45, causing an increase in plate current through the amplifier 100. The frequency of oscillation, moreover, is determined by the value of the series combination of the acoustic mass of the beams 305 and of the channel 41, corresponding to the series combination of the inductance $L_5$ and $L_{41}$ of Fig. 19, and the value of the acoustic compliance of the chambers 43, corresponding to the electrical capacitance $C_{43}$. While the electrical analogy of the acoustic energy output coupling horn 48 is not illustrated explicitly in Fig. 19, it could be represented as an equivalent electric-oscillation radiation impedance connected in series between the inductance $L_{41}$ and the ground terminal 47.

Figures 14, 16B:
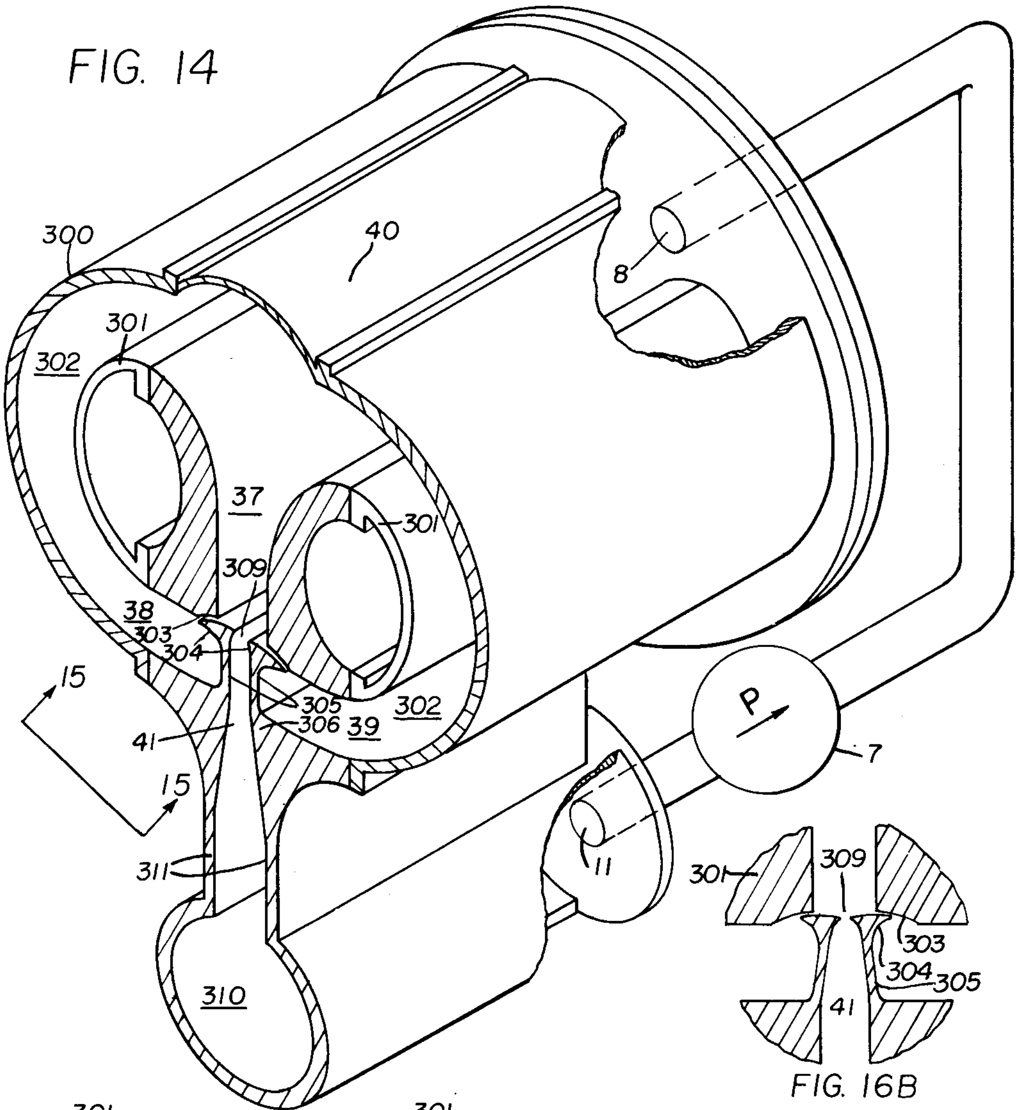
Fig. 14 is a view similar to Fig. 8 of a further modification having self-neutralizing valve action.
Figs. 15, 16A and 16B are sectional views taken upon the line 15—15 of Fig. 14, looking in the direction of the arrows, and showing three different positions of operation.
Figure 15:
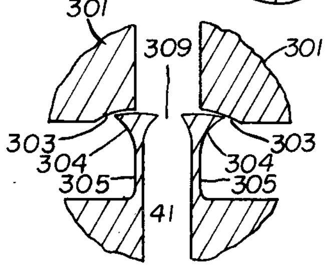
Figure 16A:
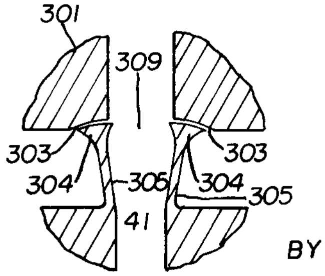

Returning, now, to the system of Fig. 14, this oscillator, like that of Fig. 18, utilizes a valve structure that consists of parallel elastic cantilever beams 305 provided along their free edges with longitudinally extending valves 304. The upper faces of the valves 304 perform the before-mentioned wiping action across the arcuate valve seats 303, permitting negligible flow at any time through the very thin annular clearance channels between the valves 304 and the valve seats 303, yet never allowing actual contact therebetween. The area of the orifice 309 between the inner edges of the valves 304 varies in response to left and right bending of the beams 305, corresponding to the upward and downward bending of the beams 305 in the embodiment of Fig. 18. Thus a flexure of both valves 304 inward, as shown in Fig. 16B, causes a closure of the orifice 309, while a flexure outward, as shown in Fig. 16A, causes an opening. The pump 7 supplies fluid through the inlet 8 into a cylindrical chamber 300 that is sub-divided by a pair of similar tubular members 301. The valve seats 303 are disposed along the lower adjacent edges of the members 301. The central region within the chamber 300 between the tubular members 301 is shown at 37, and the symmetrical feedback loops designated 302, comprise the channels between the tubular members 301 and the inner walls of the chamber 300. The fluid passes through the orifice 309 into a cylindrical exit manifold 310 through the divergent channel 41 and between the parallel guide walls 311 which serve also to support the exit manifold. The fluid returns through the manifold 310 to the outlet 11 and thence back to the pump 7. Figs. 15, 16A and 16B illustrate successive positions assumed by the valve members 304 during a cycle of operation of the oscillator of Fig. 14. Let it be assumed that the length of the feedback channels 302, from the central region 37 around the left-hand or right-hand channels 302 to the respective regions 38 and 39, is such as to sustain a frequency of oscillation that is well above the mechanical resonance frequency of the valve assembly 304—305. The displacement of either valve 304 at such a supraresonance frequency will be in phase opposition to the net pressure actuating the valve. As both valves 304 close, for example, as shown in Fig. 16B, throttling the fluid discharge through the orifice 309 by reducing its area, the pressure in the region 37 between the members 301 rises, thus initiating pressure waves that propagate away from the region 37 via the feed-back loops 302. If, by the time these pressure waves reach the regions 38 and 39, the valves 304 are moving outward, as shown in Fig. 16A, the valves 304 will be assisted in such outward movement by the positive pressure increment transmitted by the pressure waves. This is because, as before stated, the displacement of the valves 304 at frequencies above resonance is in the opposite direction to that in which the net fluid pressure acts, so that a positive pressure aids, and is associated with, a negative valve displacement. In the meantime, however, the fluid discharge through the orifice 309 has been increasing as a result of the increased opening of the orifice 309, reducing the pressure in the central region 37. This pressure reduction, in its turn, propagates around the loops 302, and reaches the regions 38 and 39, just as the valves 304 are commencing their closing cycle from the open position of Fig. 16A. The resulting negative pressure increment at the regions 38 and 39 thus aids further in the positive displacement of the valves 304 inward toward the position of closure, Fig. 16B, with which this illustrative cycle of operation was begun. The produced acoustic oscillations may be coupled out in any desired manner, as has previously been explained in connection with the other embodiments of the invention. For purposes of providing still another illustration, a somewhat different type of acoustic-energy coupling device is shown in Fig. 14, comprising an acoustic window 40. The window 40 may consist of an elastic section in the wall of the chamber 300. The motion of this elastic wall in response to pressure variations in the central region 37, permits acoustic energy to be radiated from the oscillator into a surrounding medium in which the assembly of Fig. 14 may be immersed.

The type of valve mechanism shown in the embodiment of Fig. 14 has further advantageous features. First, although the top surfaces of the valves 304 are subject to pressure variations in the central region 37, such pressure variations can not, in this case, produce any effect upon the motion of the valves 304. This is because the valve motion is constrained always to be transverse to the line of action of the fluid-dynamic forces acting on the exposed top surfaces of the valves. The valve structure 304—305 is, therefore, self-neutralizing, obviating the necessity for compensating devices such as the mechanism 30 required in the system of Fig. 12, for example, to produce neutralization. Secondly, if the chamber 310 is considered as a reservoir in which equilibrium reference pressure prevails, and if it is sufficiently removed from the orifice 309, pressure variations will be created in the narrow discharge channel 41 during the variational throttling of the fluid flow through the orifice 309 in response to the action of the valves 304. If the valves 304 are closing, Fig. 16B, decelerating the fluid flow, a rise in pressure in the central region 37 is accompanied by a drop in pressure within the channel 41. The resultant forces acting in the discharge channel 41 may now add algebraically to the net fluid force differential that is causing the motion of the valves 304. The same line of reasoning used above leads in this case to the conclusion that the net pressure variations in the discharge channel 41 are substantially one-hundred eighty degrees out of phase with those in the regions 38 and 39, with the result that the net force driving the valves 304 is accordingly increased, providing an additional useful effect.

In the oscillators previously described, the feedback system has been illustrated as, or as a major part of, an acoustic network comprising a "tank circuit" in which "fly-wheel" or cyclic storage of kinetic and elastic energy takes place, and from which a certain fraction of energy per cycle is conveyed by suitable means to an acoustic load. Such storage of energy within the feedback system itself is not essential to the oscillator operation and can be dispensed with, if so desired, in the manner of Fig. 17.

In Fig. 17 the oscillator proper, shown within the dotted lines 100, is coupled by means of flanges 118′ to a flexible hose radiator 14, as has been described in connection with the embodiment of Fig. 4, the hose being open at its end cap 14′, as illustrated at 114′. The combined assembly is illustrated as submerged within a fluid medium 17, separated by a bulkhead 15 from the supply pump 7. Pump 7 obtains its hydraulic supply from the medium 17 by means of the inlet 11, and delivers the fluid through the low-pass acoustic filter 13 to the inlet 8 of the oscillator. The fluid passes through multiple orifices 409, later described, and into and through a conduit 118 and the flexible walled hose 14, finally to discharge into the medium 17 through the opening 114′ in the end cap 14′. By controlling the size of the opening 114′, the average pressure within conduit 118 and the hose 14 may be elevated above that of the surrounding medium 17. Since the peak negative pressure variation is limited by the absolute magnitude of the average pressure, in this way greater internal pressure variations accompanied by increased acoustic energy densities are allowed. The valve assembly 401 of Fig. 17 comprises a slotted-grid "shutter" valve 404 supported by the elastic members 405, 405′ in such a way that the valve 404 may be acted upon by means of pressures in the chambers A, A′, shown above and below the valve 404, to move parallel to a rigid slotted-grid valve seat 403. In this way the relative position of the grids of the valve 404 with respect to the grids of the seat 403 controls the area of the before-mentioned multiple orifices 409, and hence the volume rate of fluid discharge into the region B of the conduit 118. The inner surfaces of the elastic valve support 405, 405′ are shown in contact with the highly compliant material 62, such as foam rubber, which serves to isolate dynamically the valve support from the internal fluid, and also to act at the inlet 8 along with the filter 13 to minimize variational accelerations and thus to relieve any inlet pressure variations.

For the purpose of understanding the operation of this oscillator, let it be assumed that the supply flow from the pump 7 is being modulated at the valve assembly 401 by a periodic motion of the valve 404, thus giving rise to variational accelerations of the fluid flux from the orifices 409 into the conduit 118. This modulatory action upon the flow acts as an equivalent acoustic volume velocity source to generate progressive waves that travel down the conduit 118 and into the flexible walled hose 14, therein to be dissipated as previously described in connection with the system of Fig. 4. As these pressure waves pass through the regions B, B′ of the conduit 118, however, an acoustic feedback response is communicated by means of the external loops 402 and 402′ to the chambers A and A′ to actuate the elastic valve supports 405, 405′. Thus, if the net difference in total feedback path length between the paths made up of 409—B—402—A and 409—B′—402—A′ is substantially equivalent to approximately one-half wavelength, such as to present, at the above periodicity of modulation, pressure signals in A and A′ that are 180° out of phase and of sufficient magnitude, then the original modulatory valving action may be sustained. Stated in other words, a conversion of direct flow energy to acoustic or vibratory energy is effected by the modulatory valving action, resulting in acoustic wave propagation down the conduit 118 toward the regions B, B′ where a fractional amount of this acoustic energy is extracted and returned through the feedback paths 402 and 402′, thereby to control and sustain the original modulatory energy-conversion process.

It may also be pointed out that the foregoing mode of operation has been described in terms of a single outward-progressing wave propagated along the conduit 118 toward the load coupling device 14. In this case the kinetic and potential energy storage essential to the operation of a self-excited oscillator resides in the regions of compression and rarefaction of the fluid medium traversed by the progressive wave system within 118 and 14. The mode of operation of the oscillator of Fig. 17 will not be fundamentally changed, however, if all the energy of the outward-progressing wave is not completely transferred to the medium 17 in a single transit through 14, so that reflection occurs at the termination 114′ of 14 and a standing wave system is thereby established in the conduits 118 and 14.

In contrast to the previously described oscillators, the elastically supported valve assembly of Fig. 17 may in this case be operated at its mechanical resonance frequency by the proper choice of feedback path lengths. The choice of average fluid flow direction, furthermore, is arbitrary, and with suitable modification in the pumping system, the oscillator can be made to operate equally well with reversed flow.

Figures 20, 21, 22, 23:
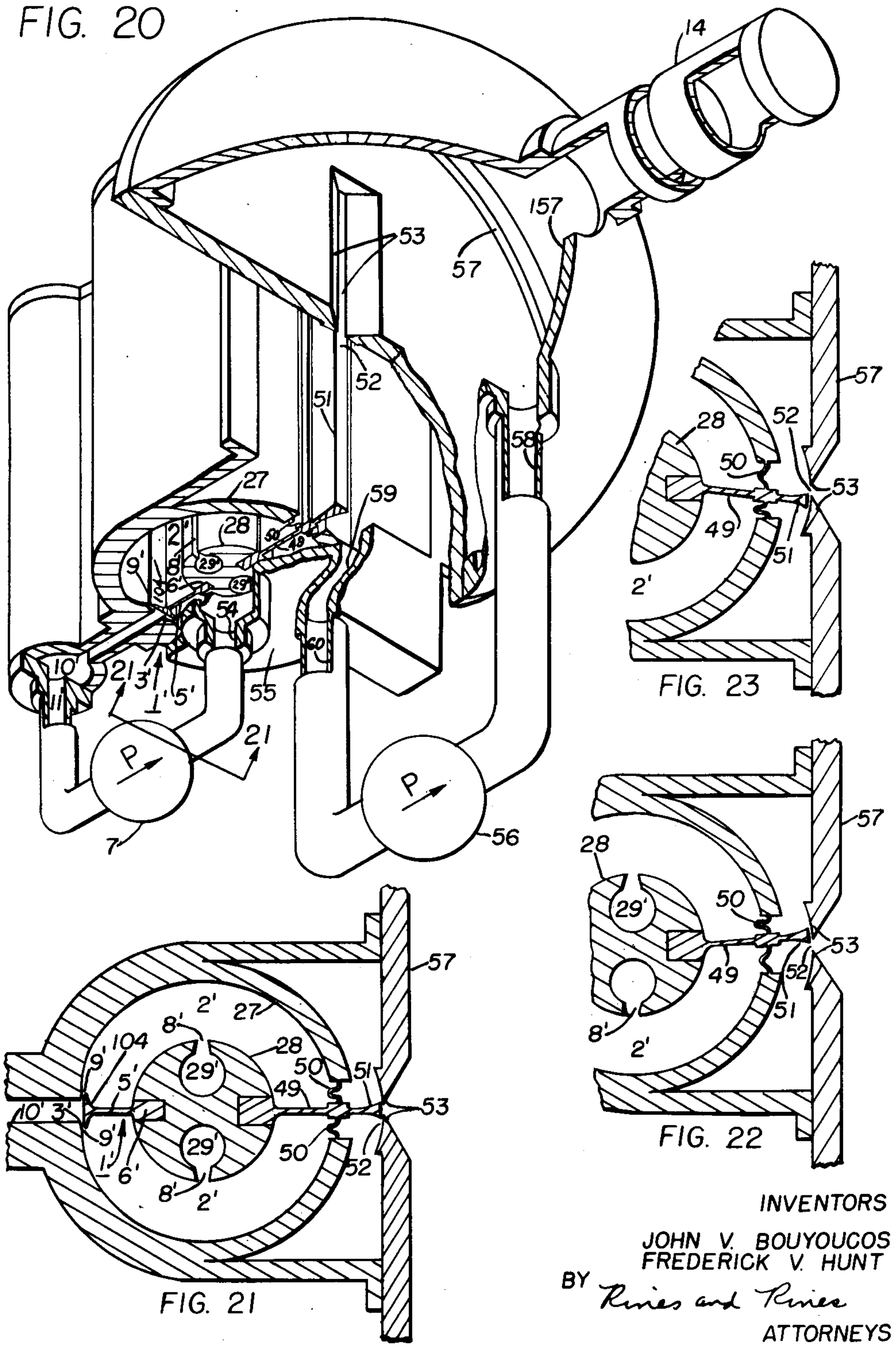
Fig. 20 is a perspective view, partly cut away and sectionalized, illustrating still a further acoustic generator provided with frequency-doubling apparatus.
Figs. 21, 22 and 23 are sectional views of the valving mechanism of Fig. 20, taken upon the line 21—21 of Fig. 20, looking in the direction of the arrows and showing three different positions of operation of the valving mechanism.

While the previously described oscillators generate any desired predetermined acoustic frequency, they may also incorporate frequency-multiplying apparatus to produce multiples thereof. Fig. 20, for example, illustrates the application of an oscillator of the present invention to drive, as its load, a hydraulic power amplifier that may produce frequency doubling. This operation, in addition, isolates or buffers the load from the oscillator so that load changes do not affect the frequency or the stability of the oscillator. This is somewhat similar to the buffer operation of frequency multiplication stages in electronic amplifier systems. While the hydraulic amplifier of Fig. 20 is driven at twice the fundamental frequency of the oscillator, clearly other multiples of the fundamental frequency may also be utilized.

While it could have taken any of the forms heretofore discussed, for purposes of illustration, the hydraulic oscillator of Fig. 20 is shown as of the push-pull type described in connection with the embodiment of Fig. 8, the similar parts of Fig. 20 being given the same reference numerals as in Fig. 8. Instead of having a single channel 29 in the cylindrical member 28 opposite the valve assembly 1′, as in Fig. 8, however, two oppositely disposed channels 29′ are provided in the system of Fig. 20 and the member 28 supports a longitudinally extending cantilever beam 49 diametrically opposite to the valve assembly 1′. This portion of the apparatus comprises the hydraulic amplifier. The cantilever beam 49 thus bisects the feed-back loop 2′, as more clearly shown in Fig. 21, being supported intermediately by sylphons 50 that connect with the walls 27. The free end of the beam 49 comprises a longitudinal valve 51 which, as the beam bends, Figs. 22 and 23, wipes along an arcuate valve seat 53 in a plate 57, thereby controlling an orifice area 52. Two extreme conditions of opened orifice are shown in Figs. 22 and 23.

The hydraulic circuit for the oscillator part of the apparatus of Fig. 20 may be traced from the pump 7 into the cylinder 27 through a cap 54 mounted upon an end flange 55 of the cylinder 27. The fluid flows into the cylindrical entrance channels 29′ and then through the longitudinal inlet slots 8′ into the feed-back channels 2′. The flow from the oscillator through the orifice 9′ between the valve 104 and the valve seat 3′ is the same as that described in connection with Fig. 8, the fluid returning to the pump 7 through the outlets 10′ and 11′.

The hydraulic circuit of the amplifier may be traced from a further pump 56 through an inlet 58 into a hemispherical chamber 157 similar to that discussed in connection with the embodiment of Fig. 18. When the valve 51 is in an open position, Figs. 22 and 23, a flow discharge through the orifice 52 takes place, and this discharge collects fluid in the rectangular receptacle 59, Fig. 20, disposed below the beam 49 and valve 51. The fluid from the amplifier then returns to the pump 56 through the outlet 60.

With the oscillator part of the structure in operation, the beam 49 executes a back and forth bending motion the maximum displacements of which, as before stated, are illustrated in Figs. 22 and 23. During each cycle of the oscillator frequency, therefore, the valve 51 is driven from its rest position, Fig. 21, to the upper position shown in Fig. 22, then, through the rest position, back to the lower position shown in Fig. 23, and then back again to the rest position of Fig. 21. The orifice 52 is thus opened twice during one complete oscillator cycle. The resulting pulsating fluid discharge through the orifice 52 creates pressure variations within the chamber 157 at a frequency double that of the oscillator frequency. These resulting pressure vairations may then be transmitted into, for example, a flexible-wall hose coupler 14, or to other output coupling devices, in order to convey the double-frequency acoustic energy to an external medium, as has heretofore been discussed.

The dependance of the frequency of acoustic oscillations generated in the hydraulic oscillators or generators of the present invention upon the dimensions of the generator structure has previously been described in connection with several embodiments of the invention. By increasing or decreasing these dimensions, therefore, the frequency may be correspondingly varied. This variation may, of course, be effected to set up acoustic oscillations of a desired predetermined frequency. It may, however, be effected in response to a signal, as, for example, by varying the length of a feed-back loop comprising telescopic elements, not shown, in response to the movement of a signal-controlled mechanically moving element, not shown, coupled thereto. The frequency variation will then follow the signal, producing frequency-modulated acoustic oscillations. The power output of the oscillators may also be varied either for modulation purposes or to attain desired predetermined power outputs. The power output is dependent upon the input ower to the oscillator, which may be exressed as the product of the average pressure increase maintained between the input and output conduits of the pump and the average fluid volume flow velocity delivered by the pump. Increasing this product, by, for example, varying the pressure established by the hydraulic pump 7 at the inlet 8, or by varying the equilibrium area of the valve-assembly orifice, will result in increasing the available acoustic power output from the oscillator. Amplitude modulation may also be produced by external control of the position of the valve mechanism, such as by controlling the regulator 34 in Fig. 12; by controlling a dimension of the feed-back loop or loops, as by means of an externally actuated valve 34′ in Fig. 17; or by any other desired means. Since the resistance to the variational flow of fluid through the valve-assembly orifice (corresponding to the plate resistance in an electron-tube circuit) and the pressure gain of the oscillator (corresponding to the amplification factor of an electron tube) will ordinarily vary with the average fluid volume flow through the oscillator structure, the frequency, as well as the power output, of the oscillator may also vary with varying pressure from the pump, especially if the oscillator is designed to have a low ratio of circulating or reactive power to average input power (low Q). An increase of average flow velocity through the orifice usually causes a decrease in oscillation frequency, and this effect may, if desired, be utilized to achieve frequency variation or frequency modulation. If such is not desired, however, a high degree of frequency stability can be achieved by designing the hydraulic oscillator to have a high Q (high ratio of circulatory power to average input power), or by utilizing a buffer amplifier as described in connection with the embodiment of Fig. 20.

It will be recognized that the foregoing specification has established and illustrated by examples the analog relationships existing between the hydraulic oscillators comprising this invention and conventional electron-tube oscillators. Many additional well known types of electron-tube circuits, including those whose particular performance features depend on quantitative aspects of design, could be recited in their hydraulic embodiment in accordance with this invention. It is specifically intended that all such features of performance that are well known in the electronics art shall, by the practice of this invention, become applicable and useful in hydraulic circuitry, and such modifications and extensions of the specific embodiments shown as may be made by reference to the hydraulic-electronic analogs herein established and to the prior art in electronics are deemed to lie within the scope of this invention.

Further modifications will occur to those skilled in the art and all such are considered to fall within the spirit and scope of the invention as defined in the appended claims.

What is claimed is:

1. A method of generating acoustic vibrations that comprises continually introducing a fluid medium under pressure into a housing, producing a variation in the rate of flow of the fluid medium at a first predetermined point therein to create a corresponding pressure variation at the first predetermined point, transmitting the pressure variation to a second predetermined point, reacting the transmitted pressure variation at the second predetermined point to produce a variation in the said rate of flow of the fluid medium at the first predetermined point of opposite sense to the first-named variation in the said rate of flow of the fluid medium, thereby to produce sustained cyclical flow of the fluid medium within the housing for generating corresponding acoustic vibrations.

2. A method of generating acoustic vibrations that comprises continually introducing a fluid medium under pressure into a housing, producing variations in the rate of flow of the fluid medium at a first predetermined point therein to create corresponding pressure variations at the first predetermined point, transmitting the pressure variations to a second predetermined point, feeding back the transmitted pressure variations to react in such phase and magnitude as to sustain the said pressure variations at the first predetermined point, thereby to produce sustained cyclical flow of the fluid medium within the housing for generating corresponding acoustic vibrations.

3. A method of generating acoustic vibrations that comprises continually introducing a fluid medium under pressure into a housing at a first predetermined point thereof to permit flow of the fluid medium through the housing to a second predetermined point where the fluid medium may be removed, and alternately first causing the flow of the fluid medium to decelerate at the second predetermined point to produce a pressure variation and thereupon feeding back the pressure variation to accelerate the flow of the fluid medium at the second predetermined point, thereby to effect pressure fluctuations in the fluid medium for generating acoustic vibrations.

4. A method of generating acoustic vibrations that comprises continually introducing a fluid medium under pressure into a housing at a first predetermined point thereof to permit flow of the fluid medium through the housing to a second predetermined point where the fluid medium may be removed through an orifice of variable area, and repetitively first reducing the area of the orifice to produce a pressure variation, thereupon feeding back the pressure variation, and then reacting the fed-back pressure variation upon the orifice to increase its area, thereby to effect pressure fluctuations in the fluid medium in the housing for generating acoustic vibrations.

5. A method of generating acoustic vibrations that comprises continually introducing a fluid medium under pressure into a housing at a first predetermined point thereof to permit flow of the fluid medium through the housing to a second predetermined point where the fluid medium may be removed, and repetitively first reducing the velocity of the fluid medium at the second predetermined point to produce a pressure variation, thereupon feeding back the pressure variation, and then reacting the fed-back pressure variation upon the second predetermined point to increase the velocity of the fluid medium at the second predetermined point, thereby to effect pressure fluctuations in the fluid medium in the housing for generating acoustic vibrations.

6. A method of generating acoustic vibrations that comprises continually introducing a fluid medium under pressure into a housing at a predetermined intermediate point thereof to permit the flow of the fluid medium in the sections of the housing on each side of the intermediate point, and alternately first simultaneously decelerating the flow of the fluid medium in one section of the housing and accelerating the flow of the fluid medium in the other section of the housing, and thereupon causing the resulting out-of-phase pressure variations produced in the said one and the said other sections respectively simultaneously to decelerate and accelerate the flow of the fluid medium in the said other and the said one sections, thereby to produce a push-pull pulsating flow of the fluid medium in the housing for generating acoustic vibrations.

7. A method of generating acoustic vibrations that comprises continually introducing a fluid medium under pressure into a housing at a first predetermined intermediate point thereof to permit the flow of the fluid medium in the sections of the housing on each side of the intermediate point to a second predetermined point where the fluid medium may be removed, and alternately first simultaneously decelerating the removal of the fluid medium from one section of the housing and accelerating the removal of the fluid medium from the other section of the housing at the second predetermined point to produce out-of-phase pressure variations in the sections of the housing, and thereupon propagating the out-of-phase pressure variations back through the housing simultaneously to decelerate the removal of the fluid medium from the other section of the housing and to accelerate the removal of the fluid medium from the said one section of the housing, thereby to effect push-pull pressure fluctuations in the fluid medium in the housing for generating acoustic vibrations.

8. A method of generating acoustic vibrations that comprises continually introducing a fluid medium under pressure into a housing at a first predetermined intermediate point thereof to permit flow of the fluid medium in the sections of the housing on each side of the intermediate point to a second predetermined point where the fluid medium may be removed from each section through an orifice of variable area, and repetitively first simultaneously reducing the area of the orifice for the removal of the fluid medium from one section of the housing and increasing the area of the orifice for the removal of the fluid medium from the other section of the housing to produce out-of-phase pressure variations in the sections of the housing, thereupon feeding the out-of-phase pressure variations in opposite directions back through the housing sections, and then reacting each pressure variation fed back from a housing section upon the orifice associated with the other housing section in order respectively simultaneously to increase the area of the orifice associated with the said one section of the housing and to reduce the area of the orifice associated with the said other section of the housing, thereby to effect push-pull pressure fluctuations in the fluid medium in the housing for generating acoustic vibrations.

9. A method of generating acoustic vibrations that comprises continually introducing a fluid medium under pressure into a housing at a first predetermined intermediate point thereof to permit flow of the fluid medium in the sections of the housing on each side of the intermediate point to a second predetermined point where the fluid medium may be removed, and repetitively first simultaneously reducing the velocity of the fluid medium in one section of the housing and increasing the velocity in the other section of the housing to produce out-of-phase pressure variations in the sections of the housing, feeding the out-of-phase pressure variations in opposite directions back through the housing sections, and then reacting each pressure variation fed back from a housing section upon the second predetermined point in order simultaneously to increase the velocity of the fluid medium in the said one section of the housing and to decrease the velocity in the said other section of the housing, thereby to effect push-pull pressure fluctuations in the fluid medium in the housing for generating acoustic vibrations.

10. A method of generating acoustic vibrations that comprises continually introducing a fluid medium under pressure into a housing, alternately decelerating flow of the fluid medium in the housing in one direction and thereupon feeding the resulting pressure variation back through the loop in the opposite direction to accelerate the flow of the fluid medium in the said one direction, thereby to produce a pulsating flow of the fluid medium in the housing for generating acoustic vibrations, and suppressing the pulsations in the flow of the fluid medium where the fluid medium is introduced into the housing.

11. A method of generating acoustic vibrations that comprises continually introducing a fluid medium under pressure at a first predetermined point of a housing to permit flow of the fluid medium in one direction through the housing to a second predetermined point where the fluid medium may be removed, alternately first decelerating the removal of the fluid medium from the housing at the second predetermined point to produce a pressure variation and thereupon propagating the pressure variation back through the loop to accelerate the removal of the fluid medium in the said one direction, thereby to effect pressure fluctuations in the fluid medium in the housing for generating acoustic vibrations, and suppressing the pressure fluctuations at the first and second predetermined points.

12. A method of generating acoustic vibrations that comprises continually introducing a fluid medium under pressure into a housing, alternately decelerating the flow of the fluid medium in the housing in one direction and thereupon feeding the resulting pressure variation back to accelerate the flow of the fluid medium in the said one direction, thereby to produce a pulsating flow of the fluid medium in the housing for generating acoustic vibrations, and coupling out part of the pulsating flow of the fluid medium from a predetermined point of the housing.

13. A method of generating acoustic vibrations that comprises continually introducing a fluid medium under pressure at a first predetermined point of a housing to permit flow of the fluid medium through the housing to a second predetermined point where the fluid medium may be removed, alternately first decelerating the removal of the fluid medium from the housing at the second predetermined point to produce a pressure variation and thereupon propagating the pressure variation back to accelerate the removal of the fluid medium, thereby to effect pressure fluctuations in the fluid medium in the housing for generating acoustic vibrations, and coupling out part of the pressure fluctuations in the fluid medium from a predetermined point of the housing.

14. A method of generating acoustic vibrations that comprises continually introducing a fluid medium under pressure into a housing, and alternately decelerating the flow of the fluid medium in the housing in one direction and thereupon feeding the resulting pressure variation back through the housing to accelerate the flow of the fluid medium in the said one direction, thereby to produce a pulsating flow of the fluid medium in the housing for generating acoustic vibrations, and amplifying the acoustic vibrations.

15. A method of generating acoustic vibrations that comprises continually introducing a fluid medium under pressure at a predetermined intermediate point of a housing to permit flow of the fluid medium in the sections of the housing on each side of the intermediate point, and alternately first simultaneously decelerating the flow of the fluid medium in one section of the housing and accelerating the flow of the fluid medium in the other section of the housing, and thereupon causing the resulting out-of-phase pressure variations produced in the said one and the said other sections respectively simultaneously to decelerate and accelerate the flow of the fluid medium in the said other and the said one section, thereby to produce a push-pull pulsating flow of the fluid medium in the housing for generating acoustic vibrations, and amplifying the acoustic vibrations.

16. A method of generating acoustic vibrations that comprises continually introducing a fluid medium under pressure into a housing, and alternately decelerating the flow of the fluid medium in the housing in one direction and thereupon feeding the resulting pressure variation back to accelerate the flow of the fluid medium in the said one direction, thereby to produce a pulsating flow of the fluid medium in the housing for generating acoustic vibrations, and multiplying the frequency of the acoustic vibrations.

17. A method of generating acoustic vibrations that comprises continually introducing a fluid medium under pressure at a predetermined intermediate point of a housing to permit flow of the fluid medium in the sections of the housing on each side of the intermediate point, and alternately first simultaneously decelerating the flow of the fluid medium in one section of the housing and accelerating the flow of the fluid medium in the other section of the housing, and thereupon causing the resulting out-of-phase pressure variations produced in the said one and the said other sections respectively simultaneously to decelerate and accelerate the flow of the fluid medium in the said other and the said one sections, thereby to produce a push-pull pulsating flow of the fluid medium in the housing for generating acoustic vibrations, and multiplying the frequency of the acoustic vibrations.

18. A method of generating acoustic vibrations that comprises continually introducing a fluid medium under pressure into a housing, and alternately decelerating the flow of the fluid medium in the housing in one direction and thereupon feeding the resulting pressure variation back to accelerate the flow of the fluid medium in the said one direction, thereby to produce a pulsating flow of the fluid medium in the housing for generating acoustic vibrations, reacting the pulsating flow upon a further fluid medium, and modulating the flow of the reacted-upon further fluid medium at a frequency that is a multiple of the frequency of the acoustic vibrations.

19. A method of generating acoustic vibrations that comprises continually introducing a fluid medium under pressure at a predetermined intermediate point of a housing to permit flow of the fluid medium in the sections of the housing on each side of the intermediate point, and alternately first simultaneously decelerating the flow of the fluid medium in one section of the housing and accelerating the flow of the fluid medium in the other section of the housing, and thereupon causing the resulting out-of-phase pressure variations produced in the said one and the said other sections respectively simultaneously to decelerate and accelerate the flow of the fluid medium in the said other and the said one section, thereby to produce a push-pull pulsating flow of the fluid medium in the housing for generating acoustic vibrations, reacting the pulsating flow upon a further fluid medium, and modulating the flow of the reacted-upon further fluid medium at a frequency that is a multiple of the frequency of the acoustic vibrations.

20. An acoustic-vibration generator having, in combination, a housing, a fluid-pressure actuated valving mechanism, means for introducing a fluid medium under pressure into said housing wherein the flow of the fluid medium may be subjected to a variational throttling action by said valving mechanism, and a frequency-controlling acoustic feedback path connected to convey fluid-dynamic pressure variations produced by the said variational throttling action upon the valving mechanism in such phase and magnitude as to control and sustain its valving action, thereby to produce a pulsating flow of the fluid medium for generating acoustic vibrations.

21. An acoustic-vibration generator having, in combination, a housing, means for continually introducing a fluid medium under pressure at a first predetermined point of the housing to permit the flow of the fluid medium in one direction through the housing to a second predetermined point, means for removing the fluid medium from the housing at the second predetermined point and means for alternately first decelerating the removal of the fluid medium from the housing at the second predetermined point to produce a pressure variation and thereupon propagating the pressure wave back to accelerate the removal of the fluid medium in the said one direction, thereby to effect pressure fluctuations in the fluid medium in the housing for generating acoustic vibrations.

22. An acoustic-vibration generator having, in combination, a housing, means for continually introducing a fluid medium under pressure at a first predetermined point of the housing to permit the flow of the fluid medium in one direction through the housing to a second predetermined point, means comprising an orifice of variable area for removing the fluid medium from the housing at the second predetermined point, and means for repetitively reducing the area of the orifice to produce a pressure variation that may thereupon feed back to react upon the fluid-removing means in order to increase the area of the orifice, thereby to effect pressure fluctuations in the fluid medium in the housing for generating acoustic vibrations.

23. An acoustic-vibration generator having, in combination, a housing, means for continually introducing a fluid medium under pressure at a first predetermined point of the housing to permit the flow of the fluid medium in one direction through the housing to a second predetermined point, means comprising a fluid-velocity regulator for removing the fluid medium from the housing at the second predetermined point, and means for repetitively reducing the fluid velocity at the second predetermined point to produce a pressure variation that may thereupon feed back to react upon the fluid-velocity regulator in order to increase the fluid velocity at the second predetermined point, thereby to effect pressure fluctuations in the fluid medium in the housing for generating acoustic vibrations.

24. An acoustic-vibration generator having, in combination, a housing, means for continually introducing a fluid medium under pressure at a predetermined intermediate point of the housing to permit the flow of the fluid medium in the sections of the housing on each side of the intermediate point, and means for repetitively simultaneously decelerating the flow of the fluid medium in one section of the housing and accelerating the flow of the fluid medium in the other section of the housing thereupon to cause the resulting out-of-phase pressure variations produced in the said one and the said other sections respectively simultaneously to decelerate and accelerate the flow of the fluid medium in the said other and the said one sections, thereby to produce a push-pull pulsating flow of the fluid medium in the housing for generating acoustic vibrations.

25. An acoustic-vibration generator having, in combination, a housing, means for continually introducing a fluid medium under pressure at a first predetermined intermediate point of the housing to permit the flow of the fluid medium in the sections of the housing on each side of the intermediate point to a second predetermined point, means for removing the fluid medium from the housing at the second predetermined point, and means for repetitively simultaneously decelerating the removal of the fluid medium from one section of the housing and accelerating the removal of the fluid medium from the other section of the housing at the second predetermined point to produce out-of-phase pressure variations in the sections of the housing that may thereupon propagate to decelerate the removal of the fluid medium from the other section of the housing and to accelerate the removal of the fluid medium from the said one section of the housing, thereby to effect push-pull pressure fluctuations in the fluid medium in the housing for generating acoustic vibrations.

26. An acoustic-vibration generator having, in combination, a housing, means for continually introducing a fluid medium under pressure into the housing, and means for alternately decelerating the flow of the fluid medium in the housing in one direction and thereupon feeding the resulting pressure variation back to accelerate the flow of the fluid medium in the said one direction, thereby to produce a pulsating flow of the fluid medium in the housing for generating acoustic vibrations, and means for filtering out fluid pulsations in the means for introducing the fluid medium into the housing.

27. An acoustic-vibration generator having, in combination, a housing, means for continually introducing a fluid medium under pressure at a first predetermined point of the housing to permit the flow of the fluid medium in one direction through the housing to a second predetermined point, means for removing the fluid medium from the housing at the second predetermined point, and means for alternately first decelerating the removal of the fluid medium from the housing at the second predetermined point to produce a pressure variation and thereupon propagating the pressure variation to accelerate the removal of the fluid medium in the said one direction, thereby to effect pressure fluctuations in the fluid medium in the housing for generating acoustic vibrations, and means for filtering out fluid pressure fluctuations in the means for introducing and removing the fluid medium to and from the housing.

28. An acoustic-vibration generator having, in combination, a housing, means for continually introducing a fluid medium under pressure into the housing, and means for alternately decelerating the flow of the fluid medium in the housing in one direction and thereupon feeding the resulting pressure variation back to accelerate the flow of the fluid medium in the said one direction, thereby to produce a pulsating flow of the fluid medium in the housing for generating acoustic vibrations, and means for coupling out of the housing part of the pulsating flow of the fluid medium.

29. An acoustic-vibration generator having, in combination, a housing, means for continually introducing a fluid medium under pressure into the housing, and means for alternately decelerating the flow of the fluid medium in the housing in one direction and thereupon feeding the resulting pressure variation back through the housing to accelerate the flow of the fluid medium in the said one direction, thereby to produce a pulsating flow of the fluid medium in the housing for generating acoustic vibrations, and means for coupling the acoustic vibrations out of a predetermined point of the housing.

30. An acoustic-vibration generator having, in combination, a housing, means for continually introducing a fluid medium under pressure into the housing, and means for alternately decelerating the flow of fluid medium in the housing in one direction and thereupon feeding the resulting pressure variation back through the housing to accelerate the flow of the fluid medium in the said one direction, thereby to produce a pulsating flow of the fluid medium in the housing for generating acoustic vibrations, and means for amplifying the acoustic vibrations.

31. An acoustic-vibration generator having, in combination, a housing, means for continually introducing a fluid medium under pressure into the housing, and means for alternately decelerating the flow of the fluid medium in the housing in one direction and thereupon feeding the resulting pressure variation back through the housing to accelerate the flow of the fluid medium in the said one direction, thereby to produce a pulsating flow of the fluid medium in the housing for generating acoustic vibrations, and means for multiplying the frequency of the acoustic vibrations.

32. An acoustic-vibration generator having, in combination, a housing, means for continually introducing a fluid medium under pressure into the housing, and means for alternately decelerating the flow of the fluid medium in the housing in one direction and thereupon feeding the resulting pressure variation back through the housing to accelerate the flow of the fluid medium in the said one direction, thereby to produce a pulsating flow of the fluid medium in the housing for generating acoustic vibrations, and means comprising a further fluid-containing housing responsive to the said pulsating flow for modulating the fluid in the further fluid-containing housing at a frequency that is a multiple of the frequency of the acoustic vibrations.

33. An acoustic-vibration generator having, in combination, a housing provided with valving mechanism operable in response to fluid pressure to either of two positions, means for continually introducing a fluid medium under pressure into the housing at a first point thereof disposed on one side of the valving mechanism and means for removing the fluid medium under pressure from the valving mechanism alternately to cause first the fluid pressure on one side of the valving mechanism to operate the valving mechanism to one of its positions and then the fluid pressure on the other side of the valving mechanism to operate the valving mechanism to its other position, thereby to produce pressure fluctuations in the fluid medium in the housing for generating acoustic vibrations.

34. Apparatus as claimed in claim 33 and in which means is provided for varying the frequency of the acoustic vibrations.

35. Apparatus as claimed in claim 33 and in which means is provided for varying the amplitude of the acoustic vibrations.

36. Apparatus as claimed in claim 33 and in which the dimensions of the loop are selected so that the resulting acoustic vibrations have a frequency different from the mechanical resonant frequency of the valving mechanism.

37. Apparatus as claimed in claim 33 and in which the said one position is the closed position of the said valving mechanism and the valving mechanism remains in the said closed position for a large fraction of the period of the acoustic vibrations.

38. An acoustic-vibration generator having, in combination, a housing provided with valving mechanism operable in response to fluid pressure to relatively effective and relatively ineffective positions, means for continually introducing a fluid medium under pressure into the housing at a first point thereof unequally spaced from the opposite sides of the valving mechanism and means for removing the fluid medium under pressure from the housing at a second predetermined point alternately to cause first the fluid pressure at the nearest side of the valving mechanism to operate the valving mechanism to its relatively effective position and then the fluid pressure on the other side of the valving mechanism to operate the valving mechanism to its relatively ineffective position, thereby to produce a pulsating flow of the fluid medium in the housing for generating acoustic vibrations.

39. An acoustic-vibration generator having, in combination, a housing provided with valving mechanism operable in response to fluid pressure to relatively effective and relatively ineffective positions, means for continually introducing a fluid medium under pressure into the housing at a first point thereof disposed on one side of the valving mechanism, and means for removing the fluid medium under pressure from the housing at a second predetermined point disposed on the other side of the valving mechanism in order alternately to cause first the fluid pressure on the said one side of the valving mechanism to operate the valving mechanism to its relatively effective position and then the fluid pressure on the said other side of the valving mechanism to operate the valving mechanism to its relatively ineffective position, thereby to produce pressure fluctuations in the fluid medium in the housing for generating acoustic vibrations.

40. An acoustic-vibration generator having, in combination, an annular housing having a closed tubular loop; a valving mechanism comprising a diaphragm, a valve mechanically supported from and responsive to movements of the diaphragm and a valve seat, the valving mechanism being connected with the tubular loop so that the valve is operable in response to fluid pressure in the loop upon the diaphragm to relatively effective and relatively ineffective positions, with respect to the valve seat; means for continually introducing a fluid medium under pressure into the loop at a first point thereof disposed on the opposite side of the valving-mechanism diaphragm from the valve; and means connected with the region between the diaphragm and the valve seat for removing the fluid medium under pressure from the valving mechanism alternately to cause first the fluid pressure on one side of the valving mechanism to operate the valving mechanism to its relatively effective position and then the fluid pressure on the other side of the valving mechanism to operate the valving mechanism to its relatively ineffective position, thereby to produce pressure fluctuations in the fluid medium in the loop for generating acoustic vibrations.

41. An acoustic-vibration generator having, in combination, an annular housing having a closed tubular loop; a valving mechanism comprising a diaphragm, a valve mechanically supported from and responsive to movements of the diaphragm and a valve seat, the valving mechanism being connected with the tubular loop so that the valve is operable in response to fluid pressure in the loop upon the diaphragm to relatively effective and relatively ineffective positions, with respect to the valve seat; means for continually introducing a fluid medium under pressure into the loop at a first point thereof disposed on the opposite side of the valving-mechanism diaphragm from the valve; means connected with the region between the diaphragm and the valve seat for removing the fluid medium under pressure from the valving mechanism alternately to cause first the fluid pressure on one side of the valving mechanism to operate the valving mechanism to its relatively effective position and then the fluid pressure on the other side of the valving mechanism to operate the valving mechanism to its relatively ineffective position, thereby to produce pressure fluctuations in the fluid medium in the loop for generating acoustic vibrations; and a constriction disposed in the means for introducing the fluid medium into the loop for filtering out pressure fluctuations.

42. An acoustic-vibration generator having, in combination, an annular housing having a closed tubular loop; a valving mechanism comprising a diaphragm, a valve mechanically supported from and responsive to movements of the diaphragm and a valve seat, the valving mechanism being connected with the tubular loop so that the valve is operable in response to fluid pressure in the loop upon the diaphragm to relatively effective and relatively ineffective positions, with respect to the valve seat; means for continually introducing a fluid medium under pressure into the loop at a first point thereof disposed on the opposite side of the valving-mechanism diaphragm from the valve; means connected with the region between the diaphragm and the valve seat for removing the fluid medium under pressure from the valving mechanism alternately to cause first the fluid pressure on one side of the valving mechanism to operate the valving mechanism to its relatively effective position and then the fluid pressure on the other side of the valving mechanism to operate the valving mechanism to its relatively ineffective position, thereby to produce pressure fluctuations in the fluid medium in the loop for generating acoustic vibrations; and an acoustic-absorber lining disposed in the means for removing the fluid medium from the loop for filtering out pressure fluctuations.

43. An acoustic-vibration generator having, in combination, an annular housing having a closed tubular loop; a valving mechanism comprising a diaphragm, a valve mechanically supported from and responsive to movements of the diaphragm and a valve seat, the valving mechanism being connected with the tubular loop so that the valve is operable in response to fluid pressure in the loop upon the diaphragm to relatively effective and relatively ineffective positions, with respect to the valve seat; means for continually introducing a fluid medium under pressure into the loop at a first point thereof disposed on the opposite side of the valving-mechanism diaphragm from the valve; means connected with the region between the diaphragm and the valve seat for removing the fluid medium under pressure from the valving mechanism alternately to cause first the fluid pressure on one side of the valving mechanism to operate the valving mechanism to its relatively effective position and then the fluid pressure on the other side of the valving mechanism to operate the valving mechanism to its relatively ineffective position, thereby to produce pressure fluctuations in the fluid medium in the loop for generating acoustic vibrations; and means for coupling pressure fluctuations in the fluid medium out of the loop to remove the acoustic vibrations.

44. An acoustic-vibration generator having, in combination, an annular housing having a closed tubular loop; a valving mechanism comprising a diaphragm, a valve mechanically supported from and responsive to movements of the diaphragm and a valve seat, the valving mechanism being connected with the tubular loop so that the valve is operable in response to fluid pressure in the loop upon the diaphragm to relatively effective and relatively ineffective positions, with respect to the valve seat; means for continually introducing a fluid medium under pressure into the loop at a first point thereof disposed on the opposite side of the valving-mechanism diaphragm from the valve; means connected with the region between the diaphragm and the valve seat for removing the fluid medium under pressure from the valving mechanism alternately to cause first the fluid pressure on one side of the valving mechanism to operate the valving mechanism to its relatively effective position and then the fluid pressure on the other side of the valving mechanism to operate the valving mechanism to its relatively ineffective position, thereby to produce pressure fluctuations in the fluid medium in the loop for generating acoustic vibrations; and means connected to the means for introducing the fluid medium in the loop for coupling acoustic vibrations out of the loop.

45. An acoustic-vibration generator having, in combination, an annular housing having a closed tubular loop; a valving mechanism comprising a diaphragm, a valve mechanically supported from and responsive to movements of the diaphragm and a valve seat, the valving mechanism being connected with the tubular loop so that the valve is operable in response to fluid pressure in the loop upon the diaphragm to relatively effective and relatively ineffective positions, with respect to the valve seat; means for continually introducing a fluid medium under pressure into the loop at a first point thereof disposed on the opposite side of the valving-mechanism diaphragm from the valve; means connected with the region between the diaphragm and the valve seat for removing the fluid medium under pressure from the valving mechanism alternately to cause first the fluid pressure on one side of the valving mechanism to operate the valving mechanism to its relatively effective position and then the fluid pressure on the other side of the valving mechanism to operate the valving mechanism to its relatively ineffective position, thereby to produce pressure fluctuations in the fluid medium in the loop for generating acoustic vibrations; and means connected to the means for removing the fluid medium from the loop for coupling acoustic vibrations out of the loop.

46. An acoustic-vibration generator having, in combination, an annular housing having a closed tubular loop; a valving mechanism comprising a diaphragm, a valve mechanically supported from and responsive to movements of the diaphragm and a valve seat, the valving mechanism being connected with the tubular loop so that the valve is operable in response to fluid pressure in the loop upon the diaphragm to relatively effective and relatively ineffective positions, with respect to the valve seat; means for continually introducing a fluid medium under pressure into the loop at a first point thereof disposed on the opposite side of the valving-mechanism diaphragm from the valve; means connected with the region between the diaphragm and the valve seat for removing the fluid medium under pressure from the valving mechanism alternately to cause first the fluid pressure on one side of the valving mechanism to operate the valving mechanism to its relatively effective position and then the fluid pressure on the other side of the valving mechanism to operate the valving mechanism to its relatively ineffective position, thereby to produce pressure fluctuations in the fluid medium in the loop for generating acoustic vibrations; and means connected to the loop for coupling pressure fluctuations in the fluid medium out of the loop to remove the acoustic vibrations.

47. Apparatus as claimed in 46 and in which the coupling means comprises a longitudinally extending flexible-walled tubular member closed at its free end.

48. An acoustic-vibration generator having, in combination, an annular housing having a closed tubular loop; a valving mechanism comprising a diaphragm, a valve mechanically supported from and responsive to movements of the diaphragm and a valve seat, the valving mechanism being connected with the tubular loop so that the valve is operable in response to fluid pressure in the loop upon the diaphragm to relatively effective and relatively ineffective positions with respect to the valve seat; means for continually introducing a fluid medium under pressure into the loop at a first point thereof disposed on the opposite side of the valving-mechanism diaphragm from the valve; and means connected with the region between the diaphragm and the valve seat for removing the fluid medium under pressure from the valving mechanism.

49. An acoustic-vibration generator having, in combination, an annular housing having a closed tubular loop; a valving mechanism comprising a diaphragm, a valve mechanically supported from each side of the diaphragm, and a valve seat associated with each valve, the valving mechanism being connected with the tubular loop so that the valves are operable in response to fluid pressure to relatively effective and relatively ineffective positions with respect to their respective valve seats; means for continually introducing a fluid medium under pressure into the loop at a first intermediate point thereof; means for removing the fluid medium under pressure from the regions of the valving mechanism between the diaphragm and each valve seat.

50. An acoustic-vibration generator having, in combination, an annular housing having a closed tubular loop; a plurality of valving mechanisms each comprising a diaphragm, a valve supported from and responsive to movements of the diaphragm and a valve seat, the valving mechanisms being connected at successive points of the loop so that each valve is operable in response to fluid pressure in the portions of the loops adjacent thereto to relatively effective and relatively ineffective positions; means for continually introducing a fluid medium under pressure into the portions of the loop between the valving mechanisms; and means for removing the fluid medium under pressure from the region between the diaphragm and the valve seat of each valving mechanism.

51. Apparatus as claimed in claim 50 and in which four valving mechanisms are provided equally spaced along the loop.

52. An acoustic-vibration generator having, in combination, a cylindrical housing having a closed cylindrical loop provided along a directrix with a longitudinally extending elastically suspended valving mechanism comprising a cantilever beam operable in response to fluid pressure to relatively effective and relatively ineffective positions, means for continually introducing a fluid medium under pressure into the loop; and means for removing the fluid medium under pressure from the valving mechanism.

53. An acoustic-vibration generator having, in combination, a spherical housing defining a closed loop, a chamber disposed within the housing provided with a valving mechanism operable in response to fluid pressure to relatively effective and relatively ineffective positions in order to permit or to obstruct the passage of fluid from the loop into the chamber, means for continually introducing a fluid medium under pressure into the spherical housing, and means for removing the fluid medium under pressure from the chamber.

54. An acoustic-vibration generator having, in combination, a spherical housing defining a closed loop, a chamber disposed within the housing provided with a valving mechanism operable in response to fluid pressure to relatively effective and relatively ineffective positions in order to permit or to obstruct the passage of fluid from the loop into the chamber, means for continually introducing a fluid medium under pressure into the spherical housing, means for removing the fluid medium under pressure from the chamber, and means for applying pressure to one side of the valving mechanism to compensate for predetermined fluid forces acting upon the other side thereof.

55. An acoustic-vibration generator having, in combination, a housing, a fluid-pressure actuated valving mechanism separating two fluid-containing sections of the housing, means for introducing a fluid medium under pressure into said housing wherein the flow of the fluid medium may be subjected to a variational throttling action by said valving mechanism, and frequency-controlling reflection means for acoustically feeding back fluid-dynamic pressure variations produced by the said variational throttling action upon the valving mechanism in such phase and magnitude as to control and sustain its valving action, thereby to produce a pulsating flow of the fluid medium for generating acoustic vibrations.

References Cited in the file of this patent

UNITED STATES PATENTS

| | | |
|---|---|---|
| 1,618,982 | Hahnemann et al. | Mar. 1, 1927 |
| 2,164,858 | West | July 4, 1939 |
| 2,693,944 | Fowle | Nov. 9, 1954 |